United States Patent
Va et al.

(10) Patent No.: US 12,282,083 B2
(45) Date of Patent: Apr. 22, 2025

(54) MULTI-FRAME RADAR PROCESSING FOR ROBUST BODY PART DETECTION FOR MOBILE DEVICES

(71) Applicant: Samsung Electronics Co., Ltd., Suwon-si (KR)

(72) Inventors: Vutha Va, Plano, TX (US); Boon Loong Ng, Plano, TX (US); Anum Ali, Plano, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 17/660,614

(22) Filed: Apr. 25, 2022

(65) Prior Publication Data

US 2022/0413116 A1 Dec. 29, 2022

Related U.S. Application Data

(60) Provisional application No. 63/215,004, filed on Jun. 25, 2021.

(51) Int. Cl.
*G01S 13/56* (2006.01)
*G01S 7/292* (2006.01)
*G01S 13/52* (2006.01)

(52) U.S. Cl.
CPC ............ *G01S 13/56* (2013.01); *G01S 7/2923* (2013.01); *G01S 13/52* (2013.01)

(58) Field of Classification Search
CPC ........ G01S 13/56; G01S 7/2923; G01S 13/52; G01S 7/006; G01S 13/68; G01S 7/415
USPC ...................................................... 342/28, 81
See application file for complete search history.

(56) References Cited

U.S. PATENT DOCUMENTS

| | | | |
|---|---|---|---|
| 10,727,889 B2 | 7/2020 | Ban et al. | |
| 10,742,249 B2 | 8/2020 | Lan et al. | |
| 2011/0187579 A1* | 8/2011 | Asada | G01S 13/18 |
| | | | 375/295 |
| 2019/0227156 A1* | 7/2019 | Santra | G01S 13/42 |
| 2020/0297236 A1 | 9/2020 | Rimini et al. | |
| 2020/0300996 A1 | 9/2020 | Cetinoneri et al. | |
| 2020/0408878 A1* | 12/2020 | Liang | G01S 7/354 |
| 2021/0126719 A1 | 4/2021 | Rimini | |

(Continued)

FOREIGN PATENT DOCUMENTS

| | | |
|---|---|---|
| CN | 104426590 A | 3/2015 |
| KR | 1020110005561 A | 1/2011 |
| KR | 102133216 B1 | 7/2020 |

*Primary Examiner* — Vladimir Magloire
*Assistant Examiner* — Remash R Guyah

(57) ABSTRACT

A method includes transmitting, via a transceiver, radar signals for object detection. The method includes determining whether a moving object is detected using received reflections of the radar signals corresponding to a current radar frame. In response to a determination that no moving object is detected using the current radar frame, the method includes determining whether a moving object is detected using received reflections of the radar signals corresponding to multiple radar frames. The method also includes generating a detection result indicating that (i) no moving object is detected using the multiple radar frames or (ii) the moving object is detected using either the current radar frame or the multiple radar frames.

20 Claims, 20 Drawing Sheets

(56) References Cited

U.S. PATENT DOCUMENTS

2021/0175919 A1\* 6/2021 Badic .................. H04B 7/0408
2021/0286045 A1\* 9/2021 Bayesteh ............. H04B 7/0695

\* cited by examiner

MULTI-FRAME RADAR PROCESSING FOR ROBUST BODY PART DETECTION FOR MOBILE DEVICES

CROSS-REFERENCE TO RELATED APPLICATION AND CLAIM OF PRIORITY

This application claims priority under 35 U.S.C. § 119(e) to U.S. Provisional Patent Application No. 63/215,004 filed on Jun. 25, 2021. The above-identified provisional patent application is hereby incorporated by reference in its entirety.

TECHNICAL FIELD

This disclosure relates generally to electronic devices. More specifically, this disclosure relates to multi-frame radar processing for robust body part detection for mobile devices.

BACKGROUND

The use of mobile computing technology such as a portable electronic device has greatly expanded largely due to usability, convenience, computing power, and the like. One result of the recent technological development is that electronic devices are becoming more compact, while the number of functions and features that a given device can perform is increasing. For example, certain electronic devices not only provide voice call services or internet browsing using a mobile communication network but can also offer radar capabilities.

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. With the increase of mobile communication, care must be taken to minimize radio frequency exposure to the user of the electronic device.

SUMMARY

This disclosure provides multi-frame radar processing for robust body part detection for mobile devices.

In one embodiment, electronic device is provided. The electronic device includes a transceiver and a processor. The processor is operably connected to the transceiver. The processor is configured to transmit, via the transceiver, radar signals for object detection. The processor is also configured to determine whether a moving object is detected using received reflections of the radar signals corresponding to a current radar frame. In response to a determination that no moving object is detected using the current radar frame, the processor is configured to determine whether a moving object is detected using received reflections of the radar signals corresponding to multiple radar frames. The processor is further configured to generate a detection result indicating that (i) no moving object is detected using the multiple radar frames or (ii) the moving object is detected using either the current radar frame or the multiple radar frames.

In another embodiment, a method is provided. The method includes transmitting, via a transceiver, radar signals for object detection. The method also includes determining whether a moving object is detected using received reflections of the radar signals corresponding to a current radar frame. In response to a determination that no moving object is detected using the current radar frame, the method includes determining whether a moving object is detected using received reflections of the radar signals corresponding to multiple radar frames. The method further includes generating a detection result indicating that (i) no moving object is detected using the multiple radar frames or (ii) the moving object is detected using either the current radar frame or the multiple radar frames.

In yet another embodiment a non-transitory computer-readable medium embodying a computer program, the computer program comprising computer readable program code that, when executed by a processor of an electronic device, causes the processor to: transmit, via a transceiver, radar signals for object detection; determine whether a moving object is detected using received reflections of the radar signals corresponding to a current radar frame; in response to a determination that no moving object is detected using the current radar frame, determine whether a moving object is detected using received reflections of the radar signals corresponding to multiple radar frames; and generate a detection result indicating that (i) no moving object is detected using the multiple radar frames or (ii) the moving object is detected using either the current radar frame or the multiple radar frames.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
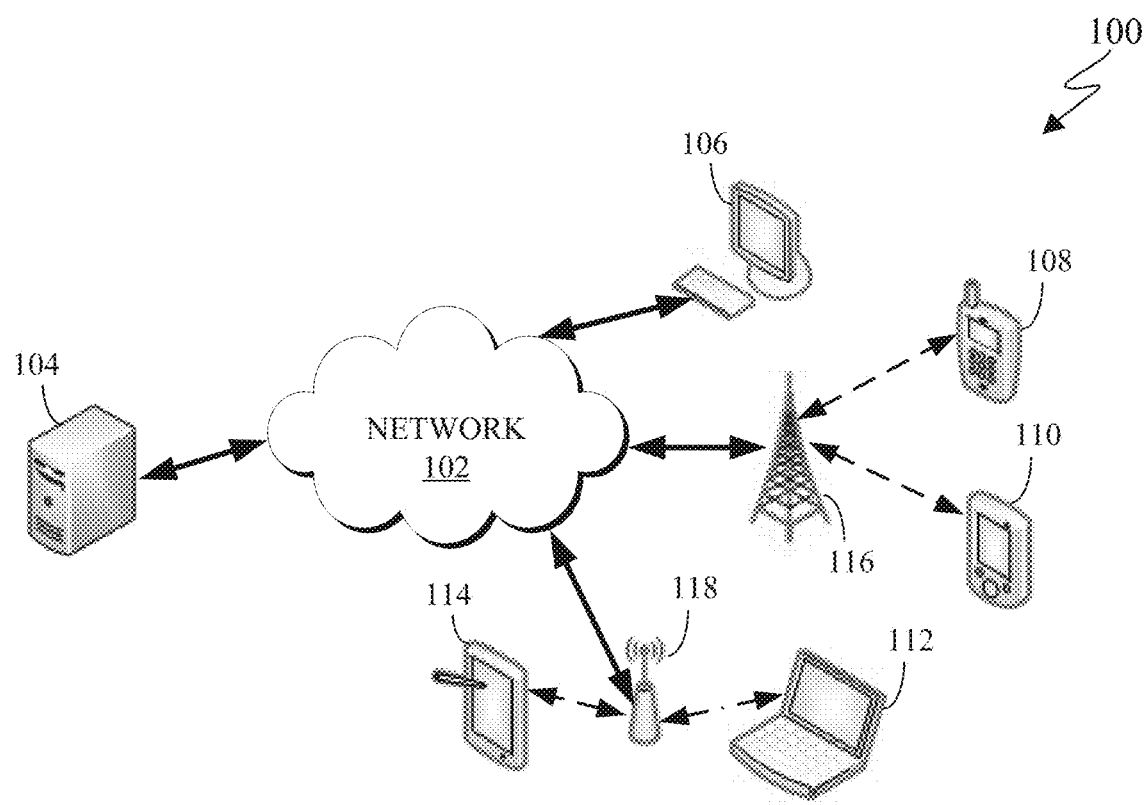
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

To meet the demand for wireless data traffic having increased since deployment of the fourth generation (4G) communication systems, efforts have been made to develop and deploy an improved 5th generation (5G) or pre-5G or new radio (NR) communication system. Therefore, the 5G or pre-5G communication system is also called a "beyond 4G network" or a "post long term evolution (LTE) system."

The 5G communication system is considered to be implemented in higher frequency (such as millimeter wave (mmWave)) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beamforming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancellation and the like.

An electronic device, according to embodiments of the present disclosure can include a user equipment (UE) such as a 5G terminal. The electronic device can also refer to any component such as mobile station, subscriber station, remote terminal, wireless terminal, receive point, vehicle, or user device. The electronic device could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like. Additionally, the electronic device can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

Figure 3A:
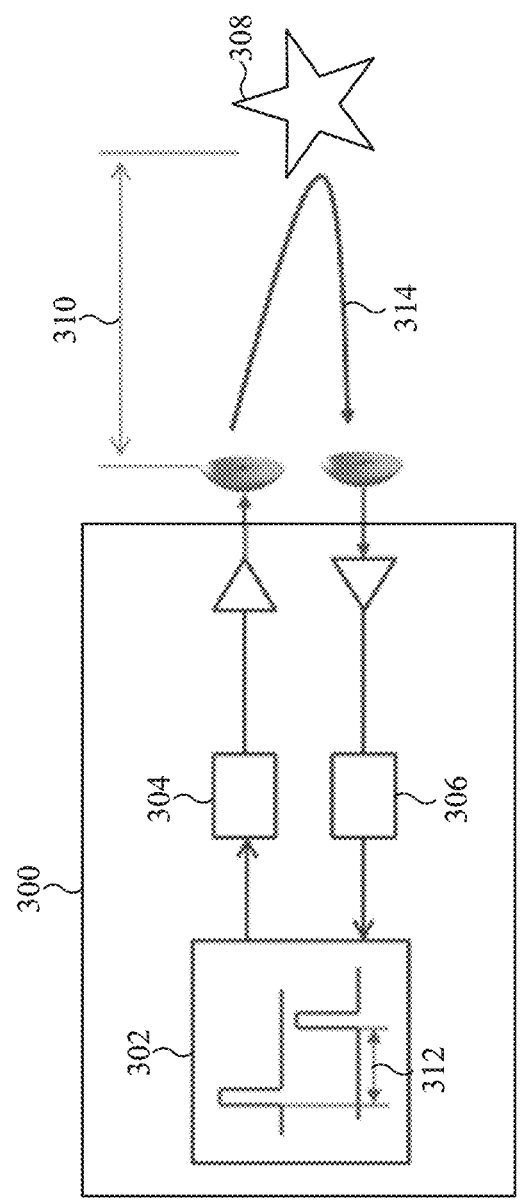
FIG. 3A illustrates an example architecture of a monostatic radar signal according to embodiments of this disclosure.
Figure 3B:
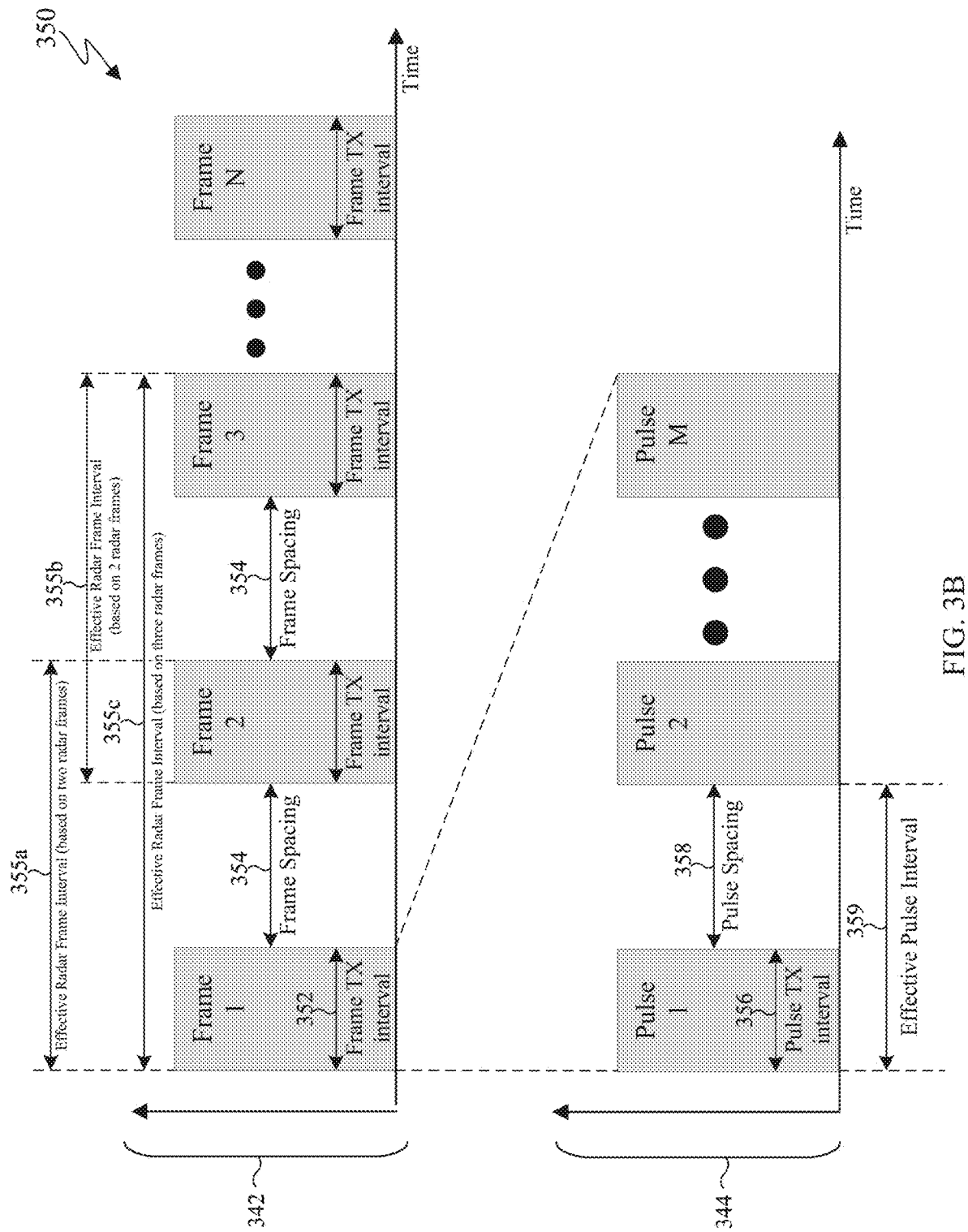
FIG. 3B illustrates an example frame structure according to embodiments of this disclosure.
Figure 3C:
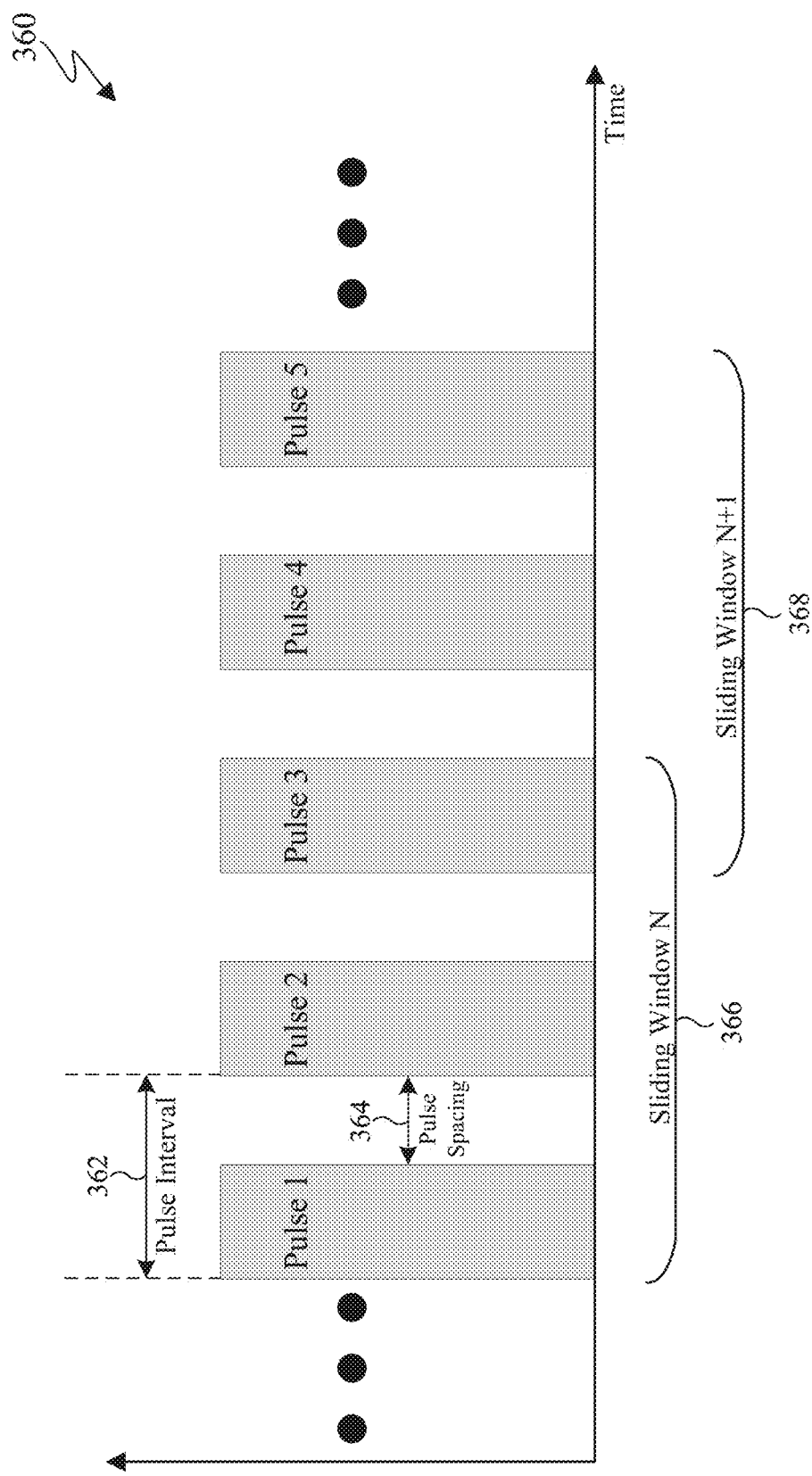
FIGS. 3C and 3D illustrate example pulse structures according to embodiments of this disclosure.
Figure 3D:
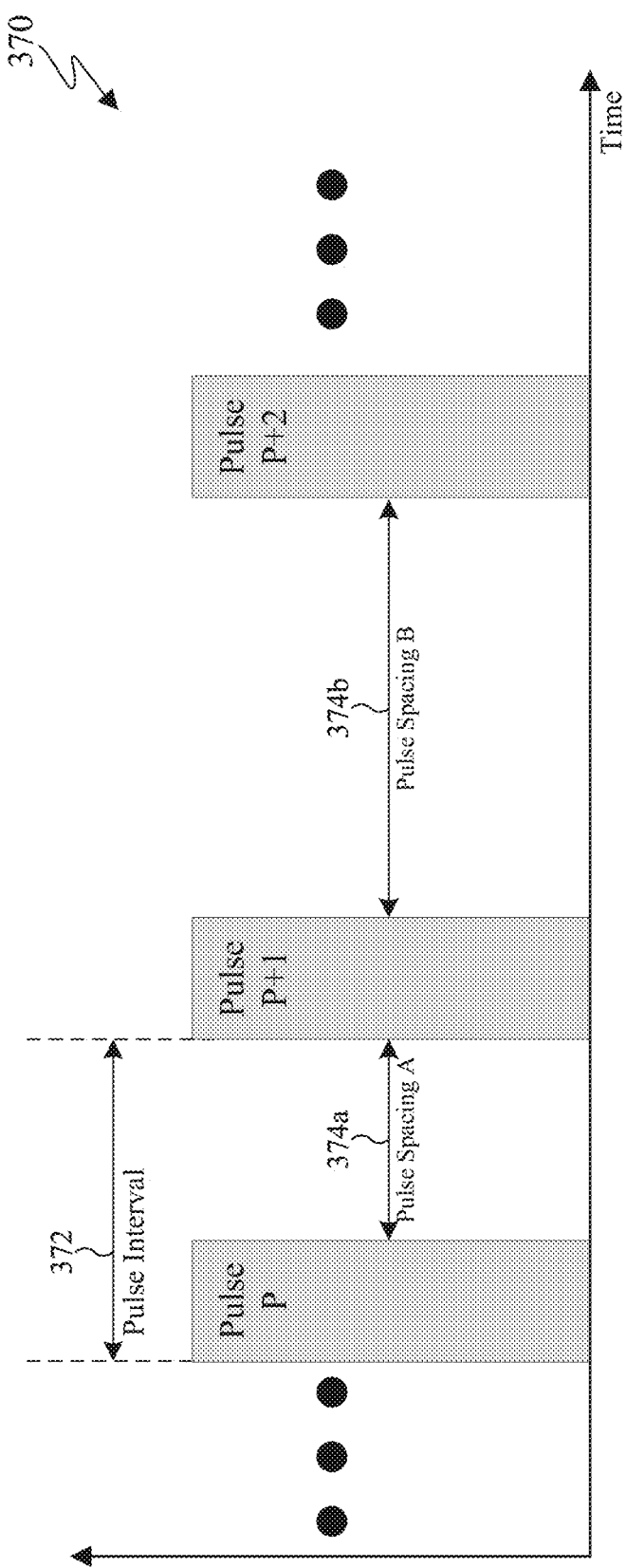
Figure 3E:
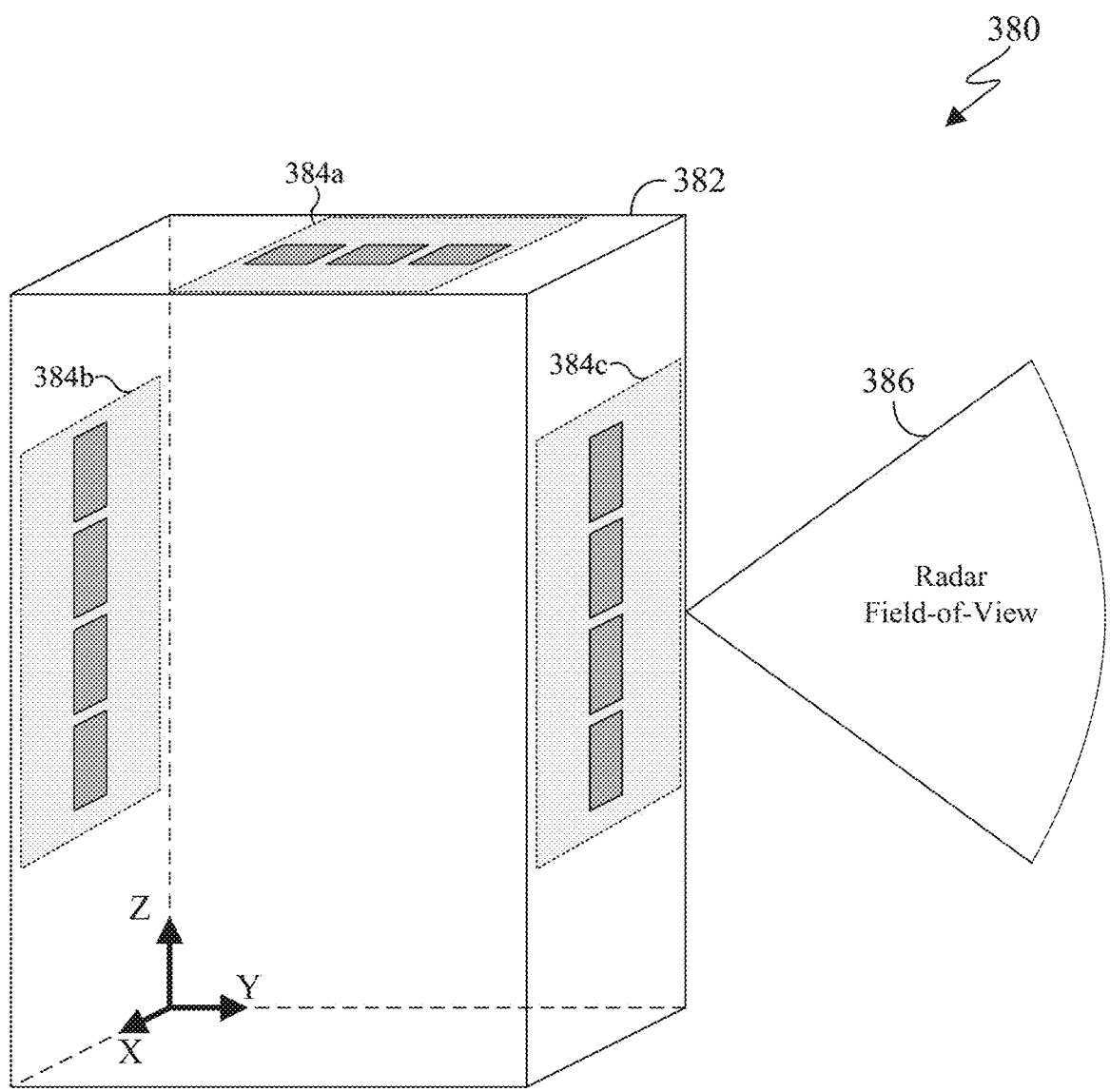
FIG. 3E illustrates a diagram of an electronic device with a field-of-view corresponding to beams according to embodiments of this disclosure.

Beamforming is typically used at both the infrastructure or network side (such as at the base station or the access point) and the UE side. For example, beamforming is an important factor when an electronic device (such as a UE)

tries to establish a connection with a base station (BS). To compensate for the increasing path loss at high frequencies, analog beams sweeping can be employed to support narrow beams that enable wider signal reception or transmission coverage for the UE. A beam codebook comprises a set of codewords, where a codeword is a set of phase shift values, or a set of amplitude plus phase shift values, applied to the antenna elements, in order to form an analog beam. FIG. 3E, described below, illustrates a UE equipped with mmWave antenna module(s) or panel(s) located on one or more of the edges of the UE. A beam management procedure is implemented at the UE to maintain the best antenna module as well as the corresponding best beam of the antenna module for signal reception and transmission by the UE. The UE may also use multiple antenna modules simultaneously, in which case the beam management procedure can determine the best beam of each antenna module for signal reception and transmission by the UE.

Embodiments of the present disclosure take into consideration that operating mmWave communications poses several challenges. The process of beamforming adjusts the antenna weights such that the transmission energy is concentrated in some direction to find the best beam. It is noted that finding the best beam for the communication uses various processing power, battery power, and other finite resources of the electronic device. Accordingly, embodiments of the present disclosure describe methods to reduce overhead. For example, the electronic device, using radar, can determine an approximate location of an external object. When a beam is directed towards the external object, the object could block (obstruct) the beam, thereby preventing that beam from being identified as a best beam due to the obstruction caused by the object relative to the beam itself. As such the electronic device can skip beams that are blocked by the object. Accordingly, overhead can be reduced when certain beams are skipped from the process of finding the best beam when those beams would be blocked due to the detected object.

Embodiments of the present disclosure also take into consideration that the focused energy used for beamforming can help provide a strong link signal for communications, but at the same time this means more radiation power in that direction, which could raise concern on the exposure to body of the user. Therefore, the use of beamforming at the electronic device can introduce health concerns due to radio frequency (RF) exposure. Due to such health concern, regulatory bodies (such as the Federal Communications Commission (FCC) in the United States of America) have sets of regulations and guidance governing such exposure. Exposure includes both exposure at low frequency (<6 GHz) and exposure at high frequency (>6 GHz). Power density (PD) is used as the exposure metric at high frequency.

Exposure limit poses a challenge regarding 5G millimeter wave uplink (UL). As discussed above, narrow beams (formed by beamforming techniques) are used for 5G millimeter wave operation, however, beamforming increases the PD and, consequently, the exposure. Certain mmWave communications take a very conservative measure to meet the exposure regulations. For example, one such approach is to use low enough Equivalent Isotropically Radiated Power (EIRP) by adjusting the duty cycle and either (i) lowering the transmit (TX) power, (ii) lowering the beamforming gain, or (iii) both lower the TX power and the beamforming gain.

Embodiments of the present disclosure take into consideration that while such a conservative measure can ensure regulatory compliance, it forces the communication operations of an electronic device to operate at suboptimal link quality and thus the electronic device cannot reap the potential for very high data rate services. For example, some solutions (non-sensing solutions) assume worst case exposure. Using lower power, using wider beams, or a combination thereof are examples of certain solutions that can be used to avoid exceeding the exposure limit. However, using low power or wide beams can limit UL quality in both coverage and throughput.

Accordingly, embodiments of the present disclosure relate to using radar to assess a situation by sensing the surroundings of the electronic device. By assessing the situation, the electronic device can avoid a pessimistic TX power control. For example, a smart exposure control solution can keep exposure compliance while minimizing the opportunity loss for communication beamforming operations.

Radar sensing can be used for ranging, angle estimation or both. In certain embodiments, an electronic device, using radar, can assess the situation around the electronic device. Upon identifying an object, the electronic device can manage the beams for communication in order to maintain regulatory RF exposure compliance while operating at enhanced link quality. For example, an electronic device, using radar can detect the presence of an object and determine whether the object is within a field of view (FoV) of a communication interface. Then depending on radar capabilities, the electronic device can perform a communication interface level or beam level adjustment to maintain exposure compliance. A communication interface can include an antenna panel. In certain embodiments, the communication interface has a radar FoV that is the same or similar to a FoV of wireless communication. An electronic device may operate using the communication interface level for maintaining exposure compliance such as when electronic device, using radar, cannot detect the angle between the electronic device and an object. This can occur if the electronic device has only one radar antenna or does not have enough angular resolution. For maintaining exposure compliance at the communication interface level, if the radar detects the presence of body part within its FoV, the electronic device may cause the communication interface to reduce the transmit power, revert to using less directional beam, abort the transmission altogether if the exposure risk is too high, or any combination thereof.

Alternatively, if the radar has good range resolution and can estimate the angle between itself and the target, the electronic device may operate using the beam level for maintaining exposure compliance. To maintain exposure compliance at the beam level, the FoV is divided into smaller FoV regions (the granularity depends on the angle resolution of the radar and expected target size). Maintaining exposure compliance at the beam level is similar to the communication interface level, with the exception that at the beam level, when a target is detected within a particular FoV region, the electronic device adjusts the transmit power for the affected beams belonging to that FoV region, instead of the entire FoV of the communication interface.

Embodiments of the present disclosure also take into consideration that the regulatory bodies limit exposure due to such health concern with respect to a human body and not inanimate objects. Accordingly, embodiments of the present disclosure relate to distinguishing between a human body part and an inanimate object (such as a table) based on using radar signals. One way to distinguish body part from an inanimate object is to rely on movement. For example, a human body will always have some movements that occur over a period of time. For instance, a human body may have micro-movements (such as breathing cycles or some other involuntary muscle activities). While micro-movements are a good identifier of a human body, it can be quite challenging to reliably detect these minor movements in a static setting as it may require a very long radar frame duration.

Accordingly, embodiments of the present disclosure describe using one or more radar frames for detecting a human body part (based on movement of the body part). That is, as the length of the radar frame increases (or as the number of shorter radar frames are combined) the reliability for detecting sporadic or weak movements of a human body part from the radar frame(s) increases. It is noted that when multiple radar frames are processed jointly, the effective radar frame duration is increased without increasing the radar duty cycle. Upon detecting movement, the electronic device can identify the detected object as a human body part. Thereafter, the electronic device can manage the beams for communication for maintaining regulatory RF exposure compliance while operating at enhanced link quality.

Embodiments of the present disclosure take into consideration that a speed of which an object (such as a human body part) moves varies. Therefore embodiments of the present disclosure describe various methods for adaptively selecting a particular number of frames for object detection. For example, if the object is moving fast then a single radar frame could be used for object detection. However, if the object is stationary (or slowly moving) then a single radar frame may not detect motion in order to distinguish an inanimate object from a human body part. Accordingly, multiple radar frames may be needed to determine whether the object is a human body part or an inanimate object. However, as the duration of the radar frame (or number of radar frames) increases, the resources of the electronic device also increase in order to processes the increased number of radar frames.

Embodiments of the present disclosure describe systems and methods for minimizing radar usage in both processing power and TX power. To minimize the overhead cost of using long radar frames (or multiple radar frames), embodiments as disclosed herein describe processing multiple radar frames to increase the radar observation time while keeping the same effective radar transmission cycle. Multi-frame processing groups adjacent radar frames together even if the frames have a large silence gap therebetween. In certain embodiments, uniform spacing of the radar pulses is not required, enabling the communication system to share similar frequency bands. For example, if there is no uniform spacing requirement the radar can transmit its pulse whenever an opportunity is available. That is, the radar can wait for the availability dictated by some scheduler (e.g., like the cellular systems) or it can wait for channel availability in a carrier sensing scenario (e.g., like the WiFi system).

Embodiments of the present disclosure also describe systems and methods for performing a first radar detection mode to determine whether a moving object is present in a FoV of a radar system. The first radar detection mode can operate on a first number of non-uniformly spaced radar pulses. Embodiments of the present disclosure further describe systems and methods for performing a second radar detection mode to determine whether the moving object is present in the FoV. The second radar detection mode can be in response to a determination by the first radar detection mode that a moving object is not present in the FoV. It is noted that the second radar detection mode operates on a second number of non-uniformly spaced radar pulses, where the second number of radar pulses is greater than the first number of radar pulses and includes one or more pulses from the first number of radar pulses.

Additionally, embodiments of the present disclosure describe systems and methods for determining whether to perform the first radar detection mode or the second radar detection mode for a next time instance. The determination can be based on a detection result from the first radar detection mode or a detection result from the second radar detection mode.

While the descriptions of the embodiments of the present disclosure describe a radar based system for object detection and motion detection, the embodiments can be applied to any other radar based and non-radar based recognition systems. That is, the embodiments of the present disclosure are not restricted to radar and can be applied to other types of sensors (such as an ultra-sonic sensor) that can provide both range, angle, speed measurements, or any combination thereof. It is noted that when applying the embodiments of the present disclosure using a different type of sensor (a sensor other than a radar transceiver), various components may need to be tuned accordingly.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone (such as a UE), a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100, such as wearable devices. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring (or radar) transceiver.

In this example, some client devices 108-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
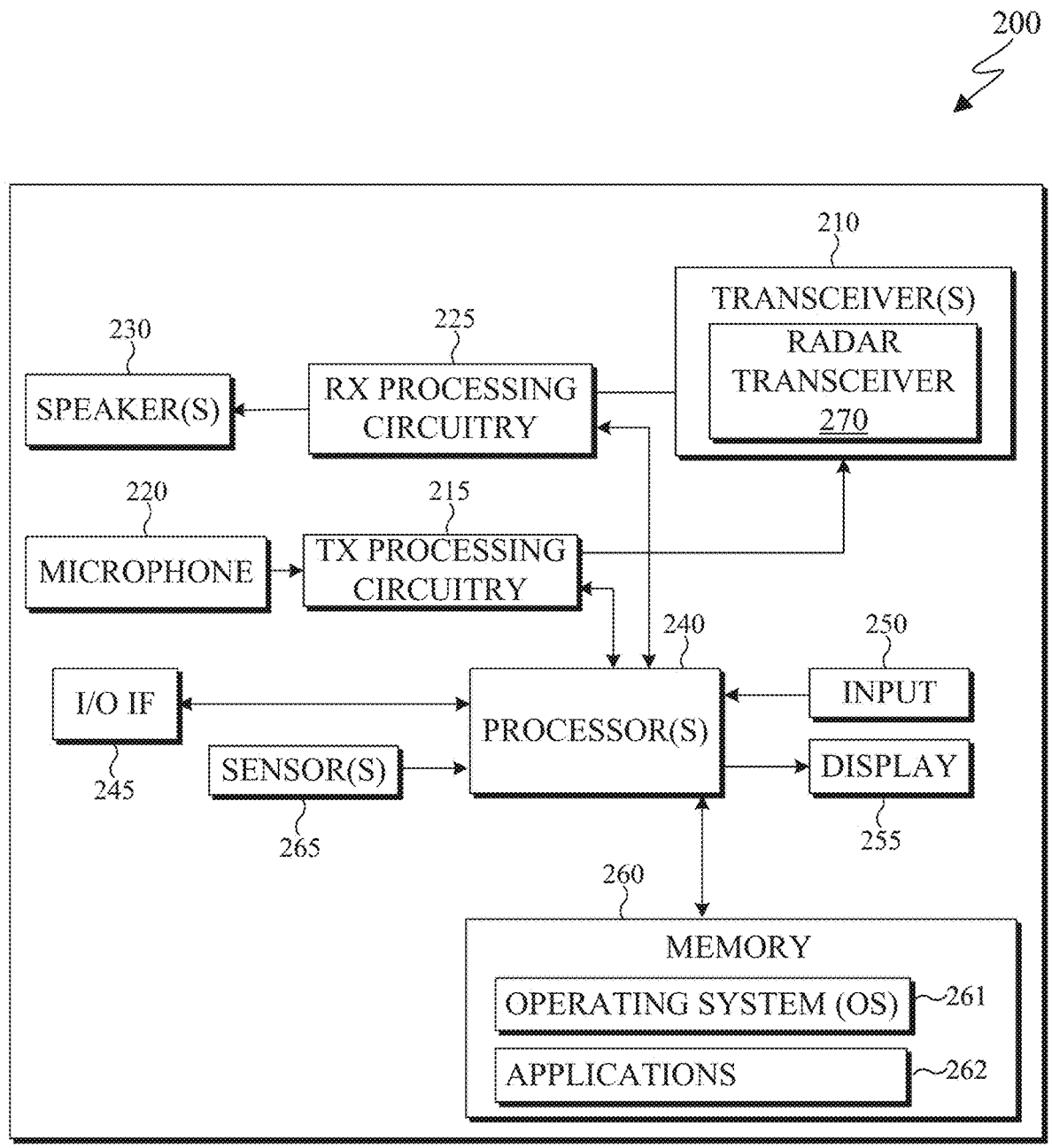
FIG. 2 illustrates an example electronic device in accordance with an embodiment of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a UE, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. For example, the transceiver(s) 210 can be equipped with multiple antenna elements. There can also be one or more antenna modules fitted on the terminal where each module can have one or more antenna elements. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type (s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the radar transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is a radar transceiver 270 that is configured to transmit and receive signals for detecting and ranging purposes. The radar transceiver 270 can transmit and receive signals for measuring range and speed of an object that is external to the electronic device 200. The radar transceiver 270 can also transmit and receive signals for measuring the angle a detected object relative to the electronic device 200. For example, the radar transceiver 270 can transmit one or more signals that when reflected off of a moving object and received by the radar transceiver 270 can be used for determining the range (distance between the object and the electronic device 200), the speed of the object, the angle (angle between the object and the electronic device 200), or any combination thereof.

The radar transceiver 270 may be any type of transceiver including, but not limited to a radar transceiver. The radar transceiver 270 can include a radar sensor. The radar transceiver 270 can receive the signals, which were originally transmitted from the radar transceiver 270, after the signals have bounced or reflected off of target objects in the surrounding environment of the electronic device 200. In certain embodiments, the radar transceiver 270 is a monostatic radar as the transmitter of the radar signal and the receiver, for the delayed echo, are positioned at the same or similar location. For example, the transmitter and the receiver can use the same antenna or nearly-co-located while using separate, but adjacent antennas. Monostatic radars are assumed coherent, such as when the transmitter and receiver are synchronized via a common time reference. FIG. 3A illustrates an example monostatic radar.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

FIG. 3A illustrates an example architecture of a monostatic radar signal according to embodiments of this disclosure. FIG. 3B illustrates an example frame structure 350 according to embodiments of this disclosure. FIGS. 3C and 3D illustrate example pulse structures 360 and 370, respectively, according to embodiments of this disclosure. FIG. 3E illustrates a diagram 380 of an electronic device 382 with a field-of-view region 386 corresponding to beams according to embodiments of this disclosure. The embodiments of FIGS. 3A-3E are for illustration only and other embodiments can be used without departing from the scope of the present disclosure.

FIG. 3A illustrates an electronic device 300 that includes a processor 302, a transmitter 304, and a receiver 306. The electronic device 300 can be similar to any of the client devices 106-114 of FIG. 1, the server 104 of FIG. 1, or the electronic device 200 of FIG. 2. The processor 302 is similar to the processor 240 of FIG. 2. Additionally, the transmitter 304 and the receiver 306 can be included within the radar transceiver 270 of FIG. 2.

The transmitter 304 of the electronic device 300 transmits a signal 314 to the target object 308. The target object 308 is located a distance 310 from the electronic device 300. For example, the transmitter 304 transmits a signal 314 via an antenna. In certain embodiments, the target object 308 corresponds to an external object (such as a human body part or a protective case of the electronic device 300). The signal 314 is reflected off of the target object 308 and received by the receiver 306, via an antenna. The signal 314 represents one or many signals that can be transmitted from the transmitter 304 and reflected off of the target object 308. The processor 302 can identify the information associated with the target object 308, such as the speed the target object 308 is moving and the distance the target object 308 is from the electronic device 300, based on the receiver 306 receiving the multiple reflections of the signals, over a period of time.

Leakage (not shown) represents radar signals that are transmitted from the antenna associated with transmitter 304 and are directly received by the antenna associated with the receiver 306 without being reflected off of the target object 308.

In order to detect the target object 308, the processor 302 analyzes a time difference 312 from when the signal 314 is transmitted by the transmitter 304 and received by the receiver 306. It is noted that the time difference 312 is also referred to as a delay, as it indicates a delay between the transmitter 304 transmitting the signal 314 and the receiver 306 receiving the signal after the signal is reflected or bounced off of the target object 308. Based on the time difference 312, the processor 302 derives the distance 310 between the electronic device 300, and the target object 308. Additionally, based on multiple time differences 312 and changes in the distance 310, the processor 302 derives the speed that the target object 308 is moving.

Monostatic radar is characterized for its delayed echo as the transmitter 304 of the radar signal and the receiver 306 of the radar signal essentially are at the same location. In certain embodiments, the transmitter 304 and the receiver 306 are co-located either by using a common antenna or nearly co-located but use separate but adjacent antennas. Monostatic radars are assumed coherent such that the transmitter 304 and the receiver 306 are synchronized via a common time reference.

A radar pulse is generated as a realization of a desired radar waveform, modulated onto a radio carrier frequency, and transmitted through a power amplifier and antenna, such as a parabolic antenna. In certain embodiments, the pulse radar is omnidirectional. In other embodiments, the pulse radar is focused into a particular direction. When the target object 308 is within the field of view of the transmitted signal and within a distance 310 from the radar location, then the target object 308 will be illuminated by RF power density (W/m²), $p_t$, for the duration of the transmission. Equation (1) describes the first order of the power density, $p_t$.

$$p_t = \frac{P_T}{4\pi R^2} G_T = \frac{P_T}{4\pi R^2} \frac{A_T}{(\lambda^2/4\pi)} = P_T \frac{A_T}{\lambda^2 R^2} \quad (1)$$

Referring to Equation (1), $P_T$ is the transmit power (W). $G_T$ describes the transmit antenna gain (dBi) and $A_T$ is an effective aperture area (m²). $\lambda$ corresponds to the wavelength of the radar signal (m), and R corresponds to the distance 310 between the antenna and the target object 308. In certain embodiments, effects of atmospheric attenuation, multi-path propagation, antenna loss and the like are negligible, and therefore not addressed in Equation (1).

The transmit power density impinging onto the target object 308 surface can cause reflections depending on the material, composition, surface shape and dielectric behavior at the frequency of the radar signal. In certain embodiments, only direct reflections contribute to a detectable receive signal since off-direction scattered signals can be too weak to be received by at the radar receiver. The illuminated areas of the target with normal vectors pointing back at the receiver can act as transmit antenna apertures with directives (gains) in accordance with their effective aperture areas. Equation (2), below, describes the reflective back power.

$$P_{refl} = p_t A_t G_t \sim p_t A_t r_t \frac{A_t}{\lambda^2/4\pi} = p_t RSC \quad (2)$$

In Equation (2), $P_{refl}$ describes the effective isotropic target-reflected power (W). The term, $A_t$, describes the effective target area normal to the radar direction (m²). The term $r_t$ describes the reflectivity of the material and shape, which can range from [0, ..., 1]. The term $G_t$ describes the corresponding aperture gain (dBi). The term RSC is the radar cross section (m²) and is an equivalent area that scales proportional to the actual reflecting area-squared inversely proportional with the wavelength-squared and is reduced by various shape factors and the reflectivity of the material itself. Due to the material and shape dependency, it is difficult to deduce the actual physical area of a target from the reflected power, even if the distance 310 to the target object 308 is known (such as stealth objects that choose material absorption and shape characters carefully for minimizing RSC).

The target reflected power at the receiver location results from the reflected power density at the reverse distance 310 collected over the receiver antenna aperture area. Equation (3), below, describes the received target reflected power. It is noted that $P_R$ is the received target reflected power (W) and $A_R$ is the receiver antenna effective aperture area (m²). In certain embodiments, $A_R$ is the same as $A_T$.

$$P_R = \frac{P_{refl}}{4\pi R^2} A_R = P_T \cdot RSC \frac{A_T A_R}{4\pi \lambda^2 R^4} \quad (3)$$

A radar system can be used as long as the receiver signal exhibits sufficient signal-to-noise ratio (SNR). The value of SNR depends on the waveform and detection method. Equation (4), below, describes the SNR. It is noted that kT is the Boltzmann constant multiplied by the current temperature. B is the radar signal bandwidth (Hz). F is the receiver noise factor which is a degradation of the receive signal SNR due to noise contributions of the receiver circuit itself.

$$SNR = \frac{P_R}{kT \cdot B \cdot F} \quad (4)$$

When the radar signal is a short pulse of duration or width, $T_p$, the delay or time difference 312 between the transmission and reception of the corresponding echo is described in Equation (5). $\tau$ corresponds to the delay between the transmission and reception of the corresponding echo and equal to Equation (5). c is the speed of light propagation in the air. When there are multiple targets at different distances, individual echoes can be distinguished only if the delays differ by at least one pulse width. As such, the range resolution of the radar is described in Equation (6). A rectangular pulse of a duration $T_P$ exhibits a power spectral density as described in Equation (7) and includes a first null at its bandwidth as shown in Equation (8). The range resolution of a radar signal is connected with the bandwidth of the radar waveform is expressed in Equation (9).

$$\tau = 2R/c \quad (5)$$

$$\Delta R = c\Delta\tau/2 = cT_p/2 \quad (6)$$

$$P(f) \sim (\sin(\pi f T_p)/(\pi f T_p))^2 \quad (7)$$

$$B = 1/T_P \quad (8)$$

$$\Delta R = c/2B \quad (9)$$

Depending on the radar type, various forms of radar signals exist. One example is a Channel Impulse Response (CIR). CIR measures the reflected signals (echoes) from potential objects as a function of distance at the receive antenna module, such as the radar transceiver 270 of FIG. 2. In certain embodiments, CIR measurements are collected from transmitter and receiver antenna configurations which when combined can produce a multidimensional image of the surrounding environment. The different dimensions can include the azimuth, elevation, range, and Doppler.

The speed resolution (such as the Doppler resolution) of the radar signal is proportional to the radar frame duration. Radar speed resolution is described in Equation (10), below.

$$\Delta v = \frac{\lambda}{2T_{tx\text{-}frame}} \quad (10)$$

Here, $\lambda$ is the wavelength of the operating frequency of the radar, and $T_{tx\text{-}frame}$ is the duration of active transmission (simply called the radar frame duration here) of the pulses in the radar frame (such as the transmission interval 352 of FIG. 3B).

A radar detection rate (also referred to as the detection probability), is described in Equation (11), below. Increasing the radar frame duration can improve the detection rate (e.g., since micro-movements of the body can be detected by increasing the radar frame duration). However, using an excessively long radar frame is not desirable, as it increases the radar transmission duty cycle, which translates to higher power consumption as well as higher risk for non-compliance with regulations.

$$\text{Radar Detection Rate} = \frac{\text{number of times detected}}{\text{number of all radar detections}} \quad (11)$$

The example frame structure 350 of FIG. 3B illustrates an example raw radar measurement. The example frame structure 350 includes multiple frames such as Frame 1, Frame 2, Frame 3, through Frame N. The frame structure 350 describes that time is divided into frames 342, where each frame has an active transmission period (denoted as a transmission interval 352) followed by a silence period (denoted as a frame spacing interval 354). During a transmission interval 352, M pulses 344 may be transmitted. The frame spacing interval 354 that is between the Frame 1 and the Frame 2 can be the same time duration or a different time duration than frame spacing interval between the Frame 2 and the Frame 3.

An effective frame interval is the time of transmission of one or more frames. For example, the effective frame interval of a single-frame is the transmission interval (such as the transmission interval 352 of Frame 1). For another example, the effective frame interval 355a and 355b include the transmission interval of two frames and a single-frame spacing that separates the two frames. The effective frame interval 355a includes the transmission interval of Frame 1 and Frame 2 and the frame spacing therebetween. Similarly, the effective frame interval 355b includes the transmission interval of Frame 2 and Frame 3 and the frame spacing therebetween. For yet another example, the effective frame interval 355c include the transmission interval of three frames and two frame spacings. That is, the effective frame interval 355c includes the transmission interval of Frame 1, Frame 2, and Frame 3 and a frame spacing between Frame 1 and Frame 2 as well as a frame spacing between Frame 2 and Frame 3. It is noted that the effective frame interval of two or more frames significantly increases the observation time for detecting a moving object as compared to a single-frame, since the observation time of two or more frames includes not only the transmission interval of frames themselves but also the frame spacing between the frames.

Each frame, such as the Frame 1 can have one or more pulse 344, such as Pulse 1, Pulse 2 through Pulse M. A pulse has an active transmission period, denoted as pulse transmission interval 356. The active transmission period of two pulses can be the same time duration or different time durations. When a frame has more than two pulses, the pulses are separated by a pulse spacing 358. The pulse spacing (such as the pulse spacing 358) between any two pulses can be the same time duration or different time durations. An effective pulse interval (such as a pulse interval 359), is the time of transmission of one pulse and the subsequent pulse spacing. For example, the pulse interval 359 is the transmission interval 356 of Pulse 1 and the pulse spacing 358.

In certain embodiments, different transmit and/or receive antenna configurations activate for each pulse or each frame. It is noted that although the example frame structure 350 illustrates only one frame type, multiple frame types can be defined in the same frame, where each frame type includes a different antenna configuration. Multiple pulses can be used to boost the SNR of the object or may use different antenna configurations for spatial processing.

In certain embodiments, each pulse or frame may have a different transmit/receive antenna configuration corresponding to the active set of antenna elements and corresponding beamforming weights. For example, each of the M pulses in a frame can have different transmit and receive antenna pair allowing for a spatial scan of the environment (such as using beamforming), and each of the frames 342 all repeat the same pulses.

The example frame structure 350 illustrates uniform spacing between pulses and frames. In certain embodiments, any spacing, even non-uniform spacing, between pulses and frames can be used.

Long radar frames can be used to generate reliable detection of an object even when there is only minor and weak movement, since there is a higher chance that movement will occur during a long frame. To minimize the cost of using long radar frames, embodiments of the present disclosure describe processing multiple radar frames together (such as the effective frame interval 355a) to increase the radar observation time while keeping the same or similar effective radar transmission cycle.

In certain embodiments, the transmission interval 352 of a frame is shorter than the frame spacing interval 354. For example, the transmission interval 352 of a frame can be 0.2 seconds for each of the frames (such as frame N) and the frame spacing interval 354 can be 0.8 seconds. In this example, when processing two consecutive frames (such as the effective frame interval 355a) the effective radar frame increases to 1.2 seconds (the duration of two of the frames which have a transmission interval of 0.2 seconds each, and the frame spacing interval of 0.8 seconds), while the actual radar transmission remains the same. Similarly, when processing three consecutive frames (such as the effective frame interval 355c) the effective radar frame increases to 2.2 seconds (the duration of three of the frames which have a transmission interval of 0.2 seconds each, and two frame spacings intervals which are 0.8 seconds each), while the actual radar transmission remains the same.

When the frame spacing is different than the pulse spacing is denoted as a first radar timing structure. FIG. 3C, describes a second radar timing structure which occurs when the frame spacing is the same as the pulse spacing.

The pulse structure 360 of FIG. 3C illustrates a special case of a frame structure. The pulse structure 360 illustrates the frame spacing (such as the frame spacing interval 354 of FIG. 3B) as being the same as the pulse spacing 364. As illustrated, the pulse interval 362 represents the time duration of a pulse and a subsequent pulse spacings (such as the pulse 1 and the pulse spacing 364). In this embodiment, there is no actual physical boundaries between the frames. This timing structure allows sliding window processing where the stride (how often to do the processing) could be selected accordingly. An illustrative example for sliding window 366 and 368 of three pulses with a stride of two is shown in FIG. 3C. As noted above, since the sampling of the pulses does not have to be uniform, the pulse spacings could vary as illustrated in FIG. 3D.

Using variable spacing between pulses and/or frames can increase flexibility and provide coexistence with other systems. For example, consider a 5G system setting, the radar may be constrained by the 5G scheduler on when the radar could operate. By allowing variable spacing, the radar can transmit whenever allowed or not impacting the 5G scheduled time. For another example, consider a WiFi-like system that implements a carrier sensing-based solution. In such a case, the availability of the medium is unknown a priori. The transmitter would have to first listen for transmission in the medium before it can transmit. This kind of uncertainty makes it difficult to guarantee uniform sampling of the pulses and/or frames.

In contrast to the pulse structure 360, the pulse structure 370 of FIG. 3D illustrates an example where the pulse spacing is not uniform. For example, Pulse P and Pulse P+1 are separated by a pulse spacing 374a while the Pulse P+1 and Pulse P+2 are separated by a pulse spacing 374b. As illustrated, pulse spacing 374a is shorter than the pulse spacing 374b. When the time duration of the pulse spacings vary, the pulse interval also vary, such as the pulse interval 372. For example, as illustrated the pulse interval 372 represents the time duration of a pulse and a subsequent pulse spacings (such as the pulse 1 and the pulse spacing 374a), while another pulse interval would represent the pulse P+1 and the pulse spacing 374b.

FIG. 3E illustrates the diagram 380, which includes an electronic device 382. The electronic device 382 can be similar to any one of the client device 106-114 of FIG. 1, the server 104 of FIG. 1, the electronic device 300 of FIG. 3A and can include internal components similar to that of electronic device 200 of FIG. 2.

The electronic device 382 includes three transceivers 384a, 384b and 384c (collectively transceivers 384). Any of the transceivers 384 can include mmWave antenna modules or panels and be similar to the transceiver 210 of FIG. 2.

Each of the three transceivers 384a, 384b and 384c include a communication module with collocated radar. In other embodiments (not shown) the communication module is not collocated with radar. Additionally, as illustrated the electronic device 382 can have three separate radar FoV regions with each FoV region corresponding to one of the transceivers 384.

In certain embodiments, the electronic device 382 can determine whether one or more objects are within a FoV region 386. In other embodiments, a remote server, such as the server 104 of FIG. 1 receives information from the electronic device 382 and determines whether one or more objects are within a FoV region 386. The determination of whether an object is within a FoV region 386 is based on the size and shape of the FoV region. It is noted that the size and shape of the FoV region is based on the capabilities of the radar as well as environmental factors at the location of the electronic device 382.

The edge of the radar FoV is defined by a boundary. A boresight is the center of the FoV region 386. The boresight can be the axis of maximum gain (such as maximum radiated power) of an antenna (e.g., a directional antenna) of the electronic device 382. In some instances, the axis of maximum gain coincides with the axis of symmetry of the antenna of the electronic device 382. For example, for axial-fed dish antennas, the antenna boresight is the axis of symmetry of the parabolic dish, and the antenna radiation pattern (the main lobe) is symmetrical about the boresight axis. Most boresight axes are fixed by their shape and cannot be changed. However, in certain implementations, the electronic device 382 includes one or more phased array antennas that can electronically steer a beam, change the angle of the boresight by shifting the relative phase of the radio waves emitted by different antenna elements, radiate beams in multiple directions, and the like. The FoV region 386 of the electronic device 382 is the range of angles around the boresight, within which an object can be detected.

In certain embodiments, the FoV region 386 can be further subdivided into smaller regions (not shown), where each smaller region is approximately the size of a beam that is used for beamforming. For example, each beam can have a width and a direction that roughly corresponds to one of the smaller regions defined within the FoV region 386.

Although FIGS. 3A-3E illustrate electronic device 300, the electronic device 382, and various radar signal structures, various changes can be made to FIGS. 3A-3E. For example, different antenna configurations can be activated, different frame timing structures can be used or the like. FIGS. 3A-3E do not limit this disclosure to any particular radar system or apparatus.

Figure 4A:
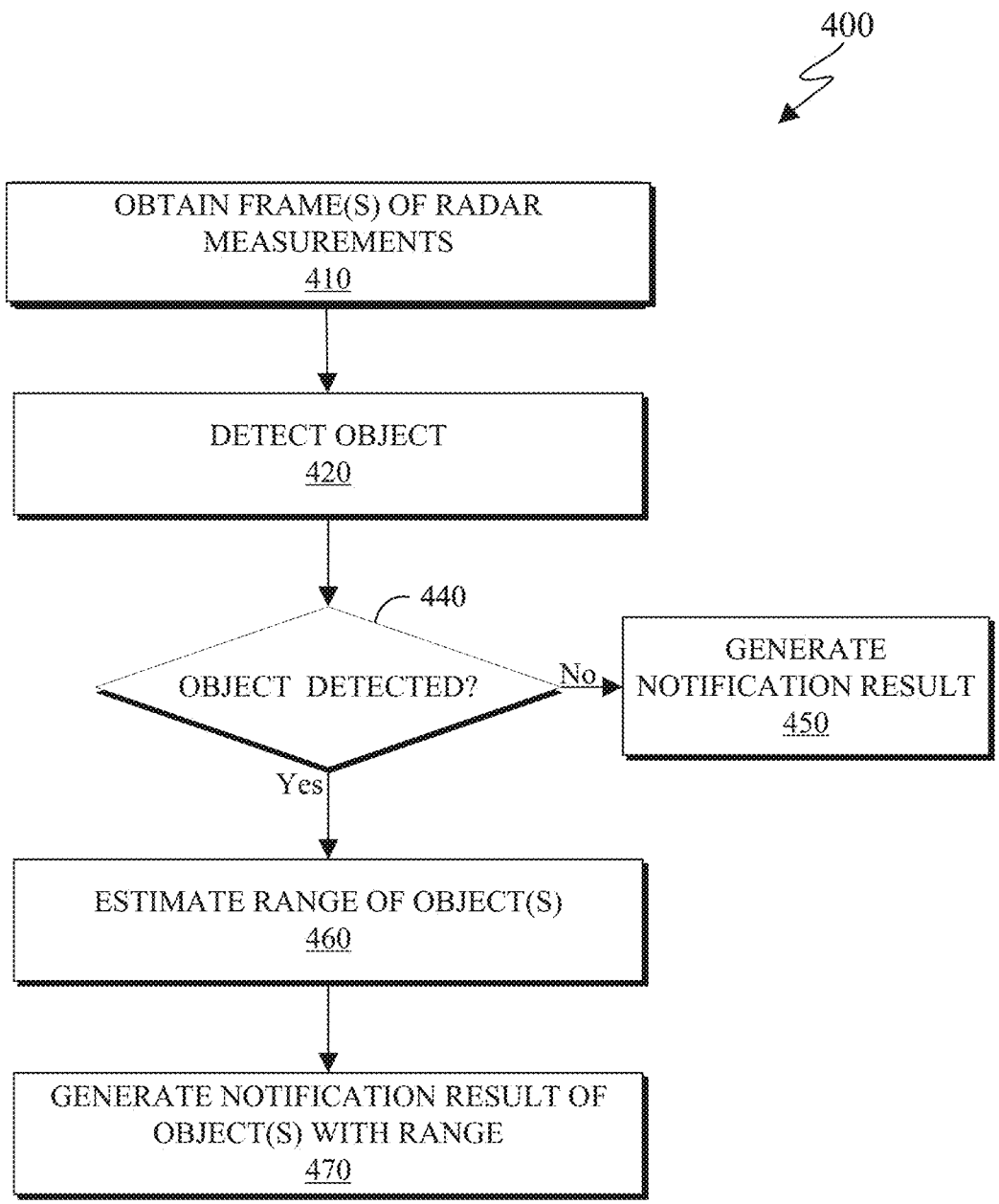
FIG. 4A illustrates a method for exposure management based on object detection according to embodiments of this disclosure.
Figure 4B:
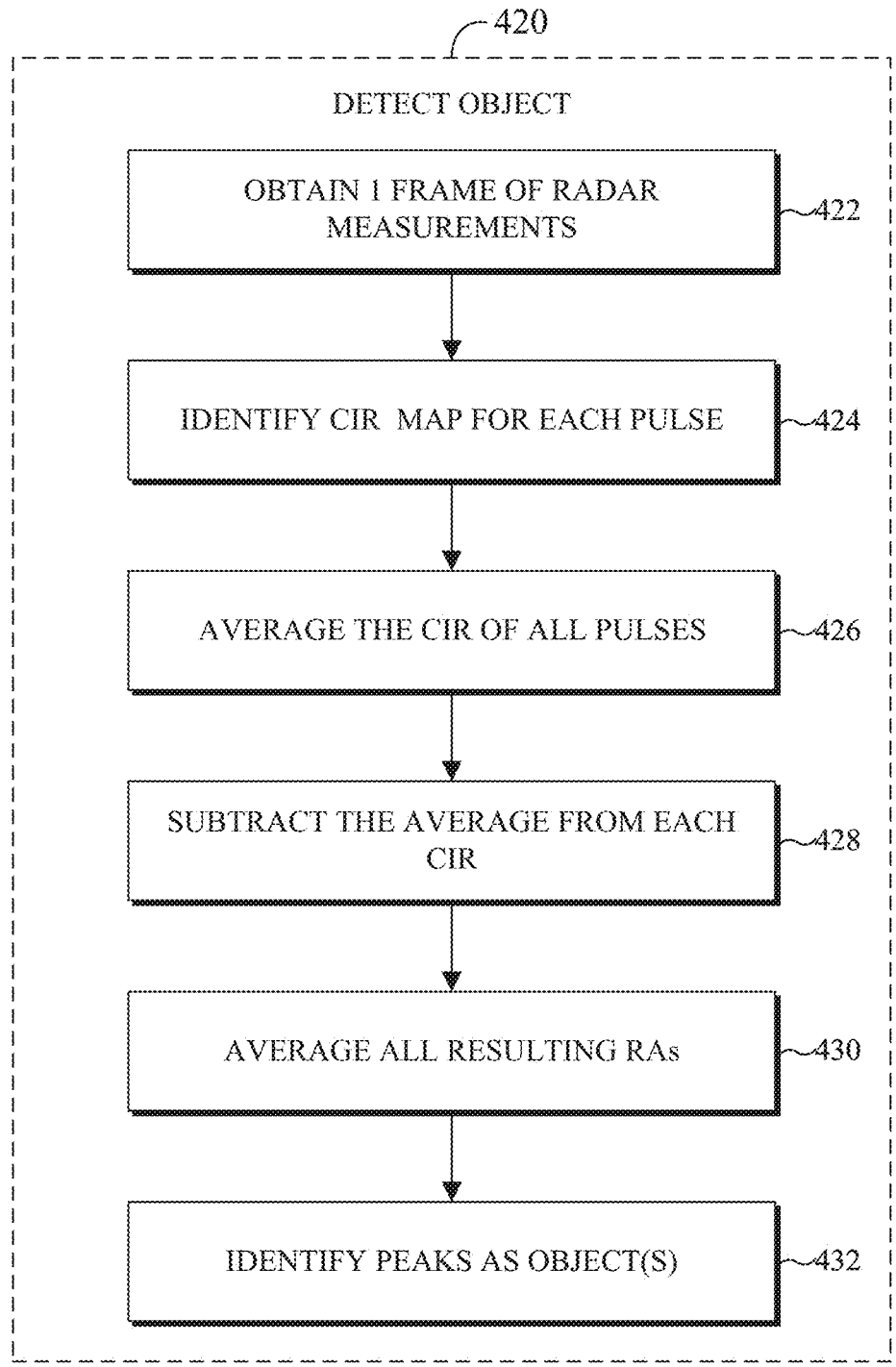
FIG. 4B illustrates a method for object detection according to embodiments of this disclosure.

FIG. 4A illustrates a method 400 for beam level exposure management based on object detection according to embodiments of this disclosure. FIG. 4B illustrates a method for object detection from step 420 of FIG. 4A according to embodiments of this disclosure for object detection.

The method 400 is described as implemented by any one of the client device 106-114 of FIG. 1, the server 104 of FIG. 1, the electronic device 300 of FIG. 3A the electronic device 382 of FIG. 3E and can include internal components similar to that of electronic device 200 of FIG. 2. However, the method 400 as shown in FIG. 4A could be used with any other suitable electronic device and in any suitable system, such as when performed by the electronic device 200. For ease of explanation, the methods of FIGS. 4A and 4B, are described as being performed by the electronic device 200 of FIG. 2.

The embodiments of the method 400 of FIG. 4A and the method of FIG. 4B are for illustration only. Other embodiments can be used without departing from the scope of the present disclosure.

The method 400 of FIG. 4A describes processing a single radar frame. The method 400 first determines whether there is moving object (such as a human body part) within the FoV of the radar, and then determines the range (distance) that each moving object is relative to the electronic device for adjusting the RF exposure level. The method 400 is described as being performed once per radar frame interval, however depending on the application requirements, system constraint, or the like, it could be desirable to select a different processing interval than the radar frame interval. For example, the processing could be performed once per N radar frames.

In step 410, the electronic device 200 obtains radar measurements. Radar measurements are obtained based on a radar transceiver (such as the radar transceiver 270 of FIG.

2) transmitting radar signals and receiving reflections of the radar signals. In certain embodiments, the radar measurements are obtained from an information repository (such as the memory 260 of FIG. 2) which stores previously derived radar measurements.

In step 420, electronic device 200 performs a detection operation for detecting a moving object from the radar measurements. Step 420 is described in detail in FIG. 4B, below. As described below, the step 420 detects moving objects and ignores stationary objects.

In step 440, the electronic device 200 determines whether a moving object is detected. If no object is detected (or the detected object is not a human body part), then the electronic device 200 generates a notification indicating that no object is detected. In this scenario (when no object is detected), the electronic device 200 may not have any constraints for transmission of the communication beams.

Alternatively, if at least one moving object, such as a human body part is detected (as determined in step 440), the electronic device 200 estimates the range of each detected object (step 460). For example, if there is at least one object detected, the range of each object is identified.

In step 470, the electronic device 200 generates a notification specifying each detected object and its respective distance from the electronic device. The electronic device can reduce the transmission power, duty cycle, or abort the transmission altogether for certain beams that correspond to the angle(s) of the detected objects. The electronic device can use other beam directions corresponding to regions where the object is not detected without exposure risk.

FIG. 4B describes the step 420 of FIG. 4A in greater detail. In particular, FIG. 4B describes target detection based on single-frame processing. Moreover, FIG. 4B describes detecting a moving object corresponding to a human body part.

In step 422, the electronic device 200 obtains measurements from one radar frame. The step 422 can obtain the radar measurements from step 410 of FIG. 4A.

In step 424, the electronic device 200 processes the obtained frame to identify a Range-Amplitude (RA) map for each pulse of the obtained radar frame. For example, the raw radar measurements are processed (pulse-compression or taking fast-Fourier transform (FFT) for Frequency Modulated Continuous Wave (FMCW) radar) to compute the Complex Impulse Response (CIR) also known as range FFT for FMCW radar, whose amplitude is the RA map. The RA map is a one dimensional signal that captures the amplitude of the reflected power from the reflectors in the FoV of the radar for a finite set of discrete range values (denoted as range tap or tap). This CIR is computed for each pulse separately.

In step 426, the electronic device 200 averages the CIRs from all the pulses within the radar frame to generate the zero-frequency (DC) component as measured by the current processed radar frame. The DC component is the estimate of the reflection from all static objects within the radar's FoV. These static reflections include the leakage (the direct transmission from the radar TX to the radar RX and other reflections off the parts of the radar equipped device) as well as other static objects (relative to the radar) not part of the device housing the radar.

In step 428, the electronic device 200 removes (subtracts) the DC component from each pulse. That is, the DC component is removed from each pulse.

In step 430, the electronic device 200 averages all resulting RA's to identify the amplitude of each range tap and averaged across all the CIRs. The resulting output is a range profile, which provide a measure of the amplitude of non-static objects within the radar's FoV for each range tap. In step 432, the electronic device 200 performs the object detection using the range profile by identifying the peaks of the range profile as targets. For example, the electronic device 200 detects the peaks in the range profile and compares the value at the peak with a detection threshold. The detection threshold can be set according to the noise floor at the particular range tap. For example, the threshold can be set to some number of times the power of the noise floor (such as 3 dB or twice the power of the noise floor). This threshold could be selected to balance misdetection and false alarm rate.

As described above, body parts of a live human can be expected to possess some movements over a period of time. The movement can be typical body movement (such as intentional hand movement such as grabbing or reaching for something or some unintentional ones such micro movement caused by the muscle reflexes, and the like). Some of the micro movements could be difficult to see visually because of the minor and weak nature of those movements. For radar the sensitivity of the detection of such movement depends on the observation time of the radar signals (which is the radar frame duration in our case). For example, the longer the frame duration is the more sensitive the radar is to the minor movement. Accordingly, the objects being detected as described in FIG. 4B are non-static objects in order to detect a body part of a human to avoid exposing the body part to RF exposure above a certain threshold.

Although FIGS. 4A and 4B illustrate examples for detecting a moving object various changes may be made to FIGS. 4A and 4B. For example, while shown as a series of steps, various steps in FIGS. 4A and 4B could overlap, occur in parallel, or occur any number of times.

Figure 5:
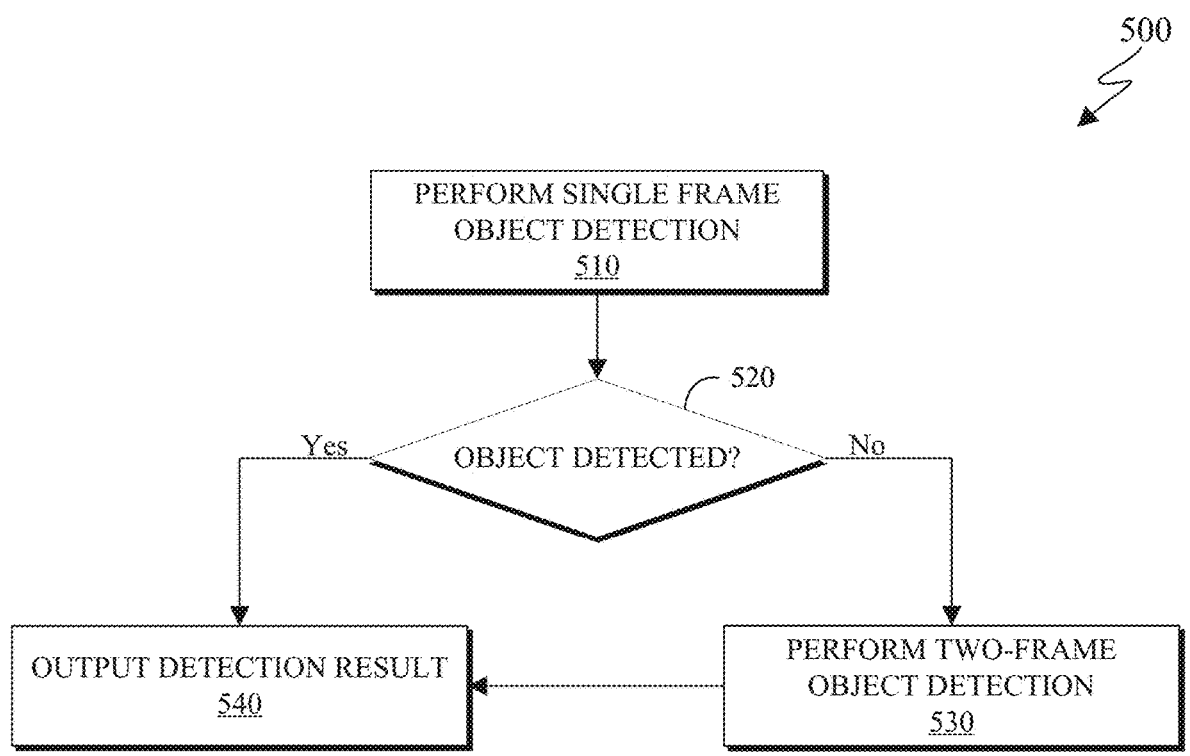
FIG. 5 illustrates an example method for determining a number of frames for object detection according to embodiments of this disclosure.

FIG. 5 illustrates an example method for determining a number of frames for object detection according to embodiments of this disclosure. The method 500 is described as implemented by any one of the client device 106-114 of FIG. 1, the electronic device 300 of FIG. 3A, the electronic device 382 of FIG. 3E, and can include internal components similar to that of electronic device 200 of FIG. 2. However, the method 500 as shown in FIG. 5 could be used with any other suitable electronic device and in any suitable system, such as when performed by the electronic device 200. The embodiments of the method 500 of FIG. 5 is for illustration only. Other embodiments can be used without departing from the scope of the present disclosure.

Embodiments of the present disclosure describe processing radar frame(s) that are long enough to provide a high sensitivity level for detecting motion, such that body parts are detected with as low misdetection rate. Embodiments of the present disclosure take into consideration that increasing the transmission interval (such as the transmission interval 352 of FIG. 3B) can reduce the misdetection rate of a human body part. This is because as the duration that the radar signals are transmitted increases, it results in an increase likelihood that the human body part will have some micro-movement during the transmission interval. However, increasing the transmission interval (such as the transmission interval 352 of FIG. 3B) is costly in that it increases the radar duty cycle to maintain the same (or similar) frame interval. Additionally, if the radar shares a wireless medium with other systems, a long frame transmission time may create a conflict between the radar and other wireless systems.

In certain embodiments, processing a frame can be increased by virtually allowing overlap between two or more frames. This allows for the transmission interval of a frame to not increase. For example, as shown in FIG. 3B, two radar frames can be used within one effective frame interval (such as that described by the effective frame interval 355a and 355b) to increase the observation time of the radar signals used for the detection. For another example, as shown in FIG. 3B, three radar frames can be used within one effective frame interval (such as the effective frame interval 355c) to increase the observation time of the radar signals used for the detection. It is noted that additional frames can also be used into a processing interval to further increase the observation time.

With single-frame processing, the observation of the radar signal within the processing frame is equal to the frame TX interval (such as the transmission interval 352 of Frame 1 of FIG. 3B). In contrast, by processing two (or more) frames, the processing interval is increased for the duration of each transmission interval of a frame and the frame spacing interval between two frames, such as the effective frame interval 355a of FIG. 3B. For example, by processing two radar frames, the observation time is described in Equation (12), below.

$$\text{(frame } TX \text{ interval)} + \text{(frame spacing)} + \text{(frame } TX \text{ interval)} = 2 \times \text{(frame } TX \text{ interval)} + \text{(frame spacing)} \quad (12)$$

As described in Equation (12) and described by the effective frame interval 355a of FIG. 3B, the processing duration is not just the active transmission interval (such as the transmission interval 352) of two frames (such as Frame 1 and Frame 2), rather the processing duration is increased due to the silence period in the frame spacing (such as the frame spacing interval 354). Additionally, depending on the detection frequency (one detection per second or the like) the frame spacing could be much larger than the frame TX interval. When the frame spacing is larger than the frame TX interval, the radar observation time for the detection increases without increasing the radar duty cycle.

There are two options for detecting a moving object when multiple-frame processing is possible. For the first option, a moving object can be detected using a single-frame. For the second option two or more frames can be used for detecting a moving object. Accordingly, embodiments of the present disclosure, such as those described in FIGS. 5-7D describe methods for determining whether to use one or more frames for detecting a moving object.

It is noted that there can be one or more moving objects in the radar's FoV. For example, an electronic device (such as a mobile device 108 of FIG. 1) can have a limited radar detection range. In this example, it can be assumed that a body part of the user of the mobile device is within the radars FoV. For another example, an electronic device can have a larger FoV and able to detect multiple different objects at different ranges and/or angles. FIGS. 5-6E describe a process for detecting a single object while FIGS. 7A-7C describe a process for detecting multiple objects within the FoV of the radar.

In such a single-object scenario, the method 500 as illustrated in FIG. 5, describes a process for determining whether to use a single-frame or multiple frames for detecting a moving object.

In step 510, an electronic device (such as the electronic device 200) performs a single frame object detection. The electronic device 200 can perform the object detection as described in step 420 of FIGS. 4A and 4B using a transmission interval of a single radar frame. As described above, the step 420 detects moving objects and ignores stationary objects. As such, the electronic device 200 attempts to detect a moving object using a single radar frame.

In step 520, the electronic device 200 determines whether a moving object is detected from the single-frame. If a moving object is detected (as determined in step 520), the electronic device 200, in step 540 outputs a detection result. That is, when a moving object is detected using a single radar frame, the electronic device 200 does not need to perform object detection using two or more radar frames.

Alternatively, if a moving object is not detected (as determined in step 520), the electronic device 200, in step 530 performs object detection using two radar frames. The electronic device 200 can perform the object detection as described in step 420 of FIGS. 4A and 4B using a transmission interval of two radar frames. As described above, the step 420 detects moving objects and ignores stationary objects. As such, the electronic device 200 attempts to detect a moving object using two or more radar frames. In certain embodiments, the electronic device 200 can perform object detection using more than two radar frames.

Upon performing object detection using the two radar frames, the electronic device 200 either detects a moving object or does not detect a moving object. In step 540, the electronic device outputs the detection result.

The detection result that is output in step 540 may indicate that a moving object is detected or indicate that no moving object is detected. When a moving object is detected, the detection result may also include additional information related to the object. For example, the additional information can indicate the distance (range) the object is from the electronic device 200. The additional information can also indicate an amount of movement of the object. For example, based information can indicate whether the detected object is relatively still or moving quickly. The additional information can further indicate a direction that the object is moving. Additionally, the additional information can indicate whether the object was detected using a single radar frame or multiple radar frames.

It is noted that the method 500 attempts to save processing power as much as possible while keeping the misdetection rate as low as possible. For example, when the object has substantial movement, it is more likely that the target movement is observed within a single radar frame. When the movement is minor or weak, an observation over one single radar frame might not be enough to reliably detect the target. In such a case, the electronic device 200 perform a two-frame processing (which requires additional computational power on top of the single-frame processing). The gain in the processing power depends on how often two-frame processing is needed. Therefore, the method 500 is most efficient when the radar frame TX interval is selected such that it is long enough that it detects most typical movements of the target. The range of value will depend on the scenario. For example, when the object is a human user sitting still, a radar frame duration of 0.2 seconds can provide 54.5% detection result, and thus a value somewhere between 0.5-1 second can provide a significantly higher detection rate. Depending on the computational power and the power consumption of the radar transmission, an appropriate choice within that range could be selected to suit the implementation constraint.

Although FIG. 5 illustrates an example method 500, various changes may be made to FIG. 5. For example, while the method 500 is shown as a series of steps, various steps could overlap, occur in parallel, occur in a different order, or occur multiple times. In another example, steps may be omitted or replaced by other steps.

FIGS. 6A-6E illustrate example methods 600, 640a, 640b, 640c, and 640d, respectively, for selecting a mode for determining a number of frames for object detection according to embodiments of this disclosure. The methods 600, 640a, 640b, 640c, and 640d are described as implemented by any one of the client device 106-114 of FIG. 1, the electronic device 300 of FIG. 3A, the electronic device 382 of FIG. 3E, and can include internal components similar to that of electronic device 200 of FIG. 2. However, the method 600, 640a, 640b, 640c, and 640d, as shown in FIGS. 6A-6E could be used with any other suitable electronic device and in any suitable system, such as when performed by the electronic device 200. The embodiments of the methods 600-640d of FIGS. 6A-6E is for illustration only. Other embodiments can be used without departing from the scope of the present disclosure.

It is noted that FIG. 5 is most efficient when the single-frame processing successfully detects the object a majority of the times, thereby saving the need to perform two-frame processing most of the times. However, there could be a scenario where movement characteristics of the object may change over time. In such a situation, running the single-frame processing at the start (such as in FIG. 5), which two frames are used for a certain scenario (such as when the electronic device is located near a user while the user is sleeping therefore moves very little) can cause extra computational cost. For example, if the object is relatively still for a period of time, the process as described in FIG. 5 would cause extra computational costs since it will attempt to detect objects using a single-frame processing prior to detecting an object using two-frame processing. Accordingly, FIGS. 6A-6E describe various processes for reducing the computation load by adaptively selecting between a first mode, as described in FIG. 5, and a second mode that uses two-frame processing.

Figure 6A:
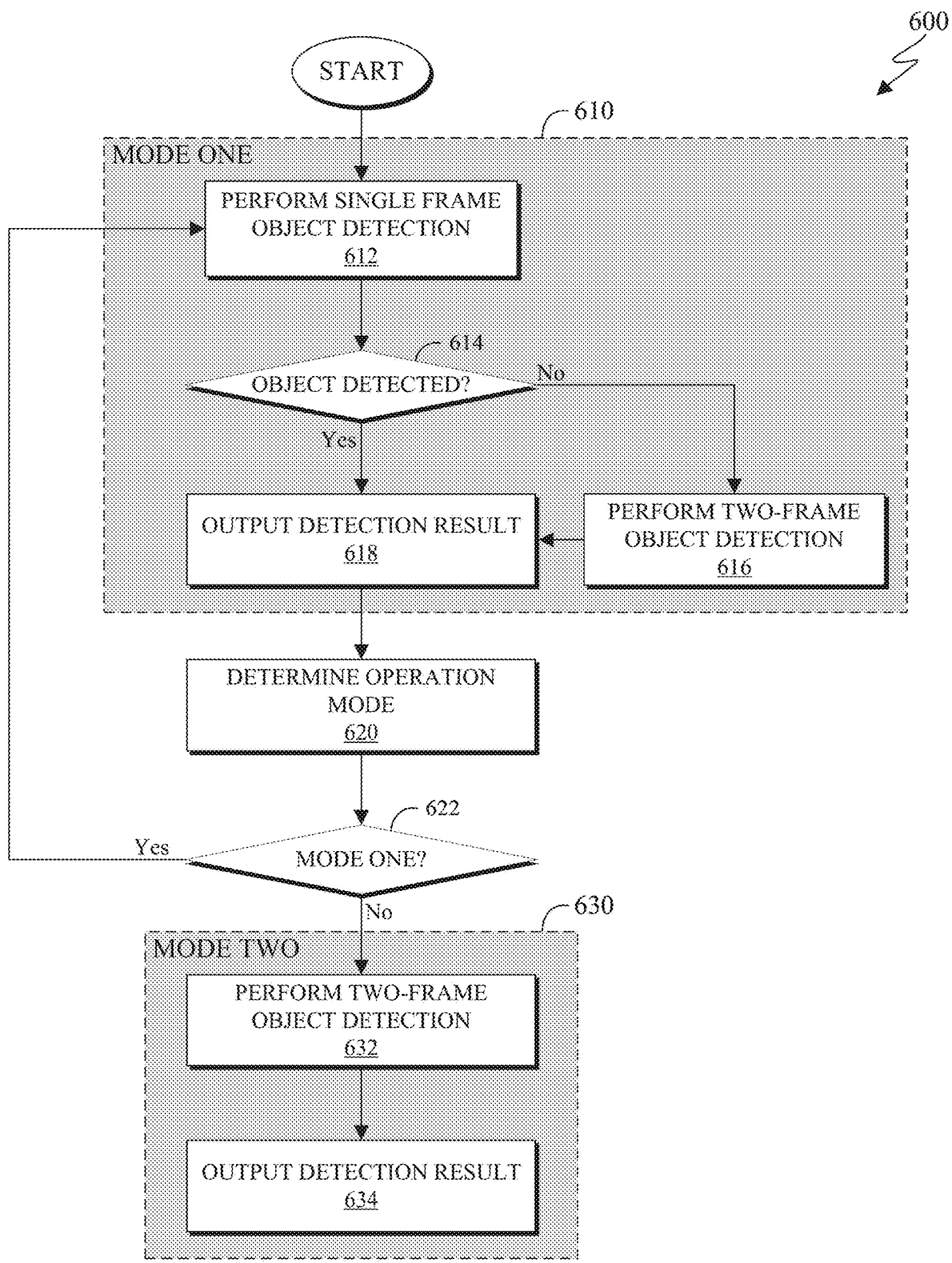
FIGS. 6A-6E illustrate example methods for selecting a mode for determining a number of frames for object detection according to embodiments of this disclosure.

FIG. 6A illustrates the method 600 for reducing the complexity by appropriately choosing an operation mode. For example, if the object's movement level is high, such that single-frame processing would detect the object most of the times, then the method 600 operates using mode one 610. Alternatively, if the objects movement level is low, such that single-frame processing would fails most of the times, then the method 600 operates using mode two 630, where the single-frame processing is skipped saving the unnecessary processing of single-frame.

The mode one 610 is similar to the method 500 as illustrated in FIG. 5. For example, in step 612, an electronic device (such as the electronic device 200) performs a single frame object detection. The electronic device 200 can perform the object detection as described in step 420 of FIGS. 4A and 4B using a transmission interval of a single radar frame. As described above, the step 420 detects moving objects and ignores stationary objects. As such, the electronic device 200 attempts to detect a moving object using a single radar frame.

In step 614, the electronic device 200 determines whether a moving object is detected using the single-frame. If a moving object is detected (as determined in step 614), the electronic device 200, in step 618 outputs a detection result. The detection result could indicate that a moving object is detected, along with other information such as the distance between the electronic device and the object, and the like.

Alternatively, if a moving object is not detected (as determined in step 614), the electronic device 200, in step 616 performs object detection using two (or more) radar frames. The electronic device 200 can perform the object detection as described in step 420 of FIGS. 4A and 4B using a transmission interval of a two radar frame. As described above, the step 420 detects moving objects and ignores stationary objects. As such, the electronic device 200 attempts to detect a moving object using a two or more radar frames. In certain embodiments, the electronic device 200 can perform object detection using more than two radar frames.

After performing object detection using the two radar frames, the electronic device 200 either detects a moving object or does not detect a moving object. In step 618, the electronic device 200 outputs the detection result. The detection result that is output in step 618 may indicate that a moving object is detected or indicate that no moving object is detected. When a moving object is detected, the detection result may also include additional information related to the object, such as described above in FIG. 5.

In step 620, the electronic device 200 determines an operation mode to be used for a subsequent object detection. By determining whether to use mode one 610 or mode two 630 for a subsequent object detection adapts the processing mode to the level of movement of the object. For example, if the object has little movement, then mode two 630 may be better suited for object detection. In contrast, if the object has high movement, then mode one 610 may be better suited for object detection. FIGS. 6B-6E describe various criteria that can be used when determining whether to use mode one 610 or mode two 630 for object detection.

In step 622, the electronic device determines whether the identified mode is mode one 610. In response to a determination that mode one 610 is to be performed (as identified in step 620), then the electronic device 200 returns to step 612 for a subsequent object detection. Alternatively, in response to a determination that mode two 630 is to be performed (as identified in step 620), then the electronic device proceeds to the step 632.

In step 632, the electronic device performs object detection using two (or more) radar frames. It is noted that step 632 is similar to step 616. In step 632, the electronic device 200 performs the object detection as described in step 420 of FIGS. 4A and 4B using a transmission interval of two (or more) radar frames. As described above, the step 420 detects moving objects and ignores stationary objects. As such, the electronic device 200 attempts to detect a moving object using two or more radar frames. In certain embodiments, the electronic device 200 can perform object detection using more than two radar frames.

In certain embodiments, the determination of the operation mode (such as mode one 610 or mode two 630) may be based on how frequent two-frame processing is used. A two-frame utilization rate, described in Equation (13), is the rate at which the object is detected using 2-frames but not single-frame.

$$\text{2-frame utilization rate} = \frac{\text{\# times object was detected by 2-frame but not by single-frame}}{\text{\# times both processings were conducted}} \quad (13)$$

Figure 6B:
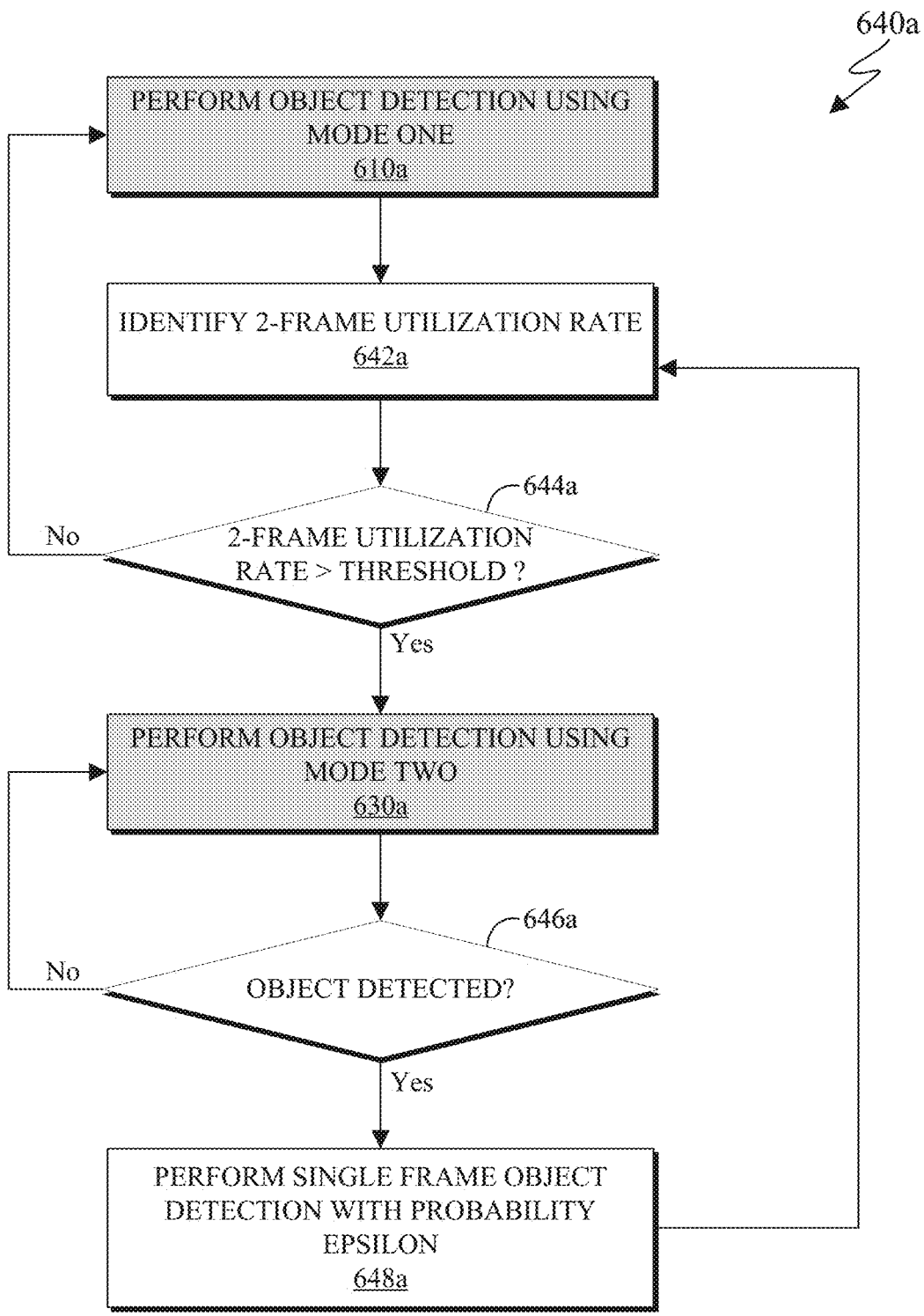

FIG. 6B illustrates the method 640a describing process for determining whether to use mode one 610 or mode two 630 for object detection. An electronic device (such as the electronic device 200) initially starts with mode one 610. That is, in step 610a, the electronic device 200 performs object detection using mode one 610.

In step 642a, the electronic device 200 identifies the two-frame utilization rate. The two-frame utilization rate can be identified using Equation (13). It is noted that after performing object detection using mode one 610 (step 610*a*), the electronic device 200 has enough information to identify the utilization rate, since mode one 610 can perform object detection using a single-frame or two-frames.

In certain embodiments, the electronic device 200 uses Equation (14), which is a modification of the Equation (13), to identify the two-frame utilization rate. It is noted that Equation (14) can be used after the electronic device 200 performs object detection using mode one 610 (step 610*a*).

$$\text{2-frame utilization rate while in mode 1} = \frac{\text{\# times object was detected by 2-frame but not by single-frame while in mode 1}}{\text{\# times both processings were conducted while in mode 1}} \quad (14)$$

When the movement of the object level is low, it will result in a high two-frame utilization rate, and therefore it is efficient to operation using mode two 630. Alternatively, when the utilization rate is low (indicating that the movement of the object is fast), it is efficient to operate using mode one 610.

In step 644*a*, the electronic device 200 determines whether the two-frame utilization rate is greater than a predefined threshold. In certain embodiments, the predefined threshold is a large value. For example, the predefined threshold can be 80%. For another example, the predefined threshold can be 90%. For another example, the predefined threshold can be a value between 80% and 90%. For yet another example, the predefined threshold can be any value higher than 50%.

When the two-frame utilization rate is less than or equal to the predefined threshold (as determined in step 644*a*), the electronic device 200 returns to step 610*a*, and uses mode one 610 for a subsequent object detection. Alternatively, when the two-frame utilization rate is greater than the predefined threshold (as determined in step 644*a*), the electronic device 200 performs object detection using mode two 630 (step 630*a*).

After object detection is performed using mode two 630 (step 630*a*), the electronic device 200 in step 646*a*, determines whether a moving object was detected. When a moving object is not detected, the electronic device 200 returns to step 630*a* for a subsequent object detection operation. Alternatively, when a moving object is detected using mode two 630, the electronic device 200 in step 648*a* may performs additional processing to estimate an updated two-frame utilization rate. The additional processing is based on a reinforcement learning process such as the Epsilon-greedy exploration. In particular, while operating in mode two 630, the electronic device may perform single-frame processing with a probability of Epsilon. Epsilon is a predefined value. For example, Epsilon can be a predefined small number such as between 1% to 5%. In certain embodiments, other multi-armed bandit exploration such as the Upper Confidence Bound (UCB) and Thompson sampling may also be used. After determining whether to perform a single-frame processing, the single-frame processing is performed.

After performing the single-frame processing or determining not to perform the single-frame processing, the electronic device 200 identifies the two-frame utilization rate (step 642*a*). The two-frame utilization rate can be identified using Equation (13) using results from those times where single-frame processing is conducted. In certain embodiments, the electronic device 200 uses Equation (15), which is a modification of the Equation (13), in step 642*a* to identify the two-frame utilization rate after the electronic device 200 performs object detection using mode two 630 (step 630*a*) and step 648*a*. It is noted, that Equation (15) takes into account the utilization rate from the times single-frame processing was conducted while mode two is performed.

$$\text{2-frame utilization rate while in mode 2} = \frac{\text{\# times object was detected by 2-frame but not by single-frame while in mode 2}}{\text{\# times both processings were conducted while in mode 2}} \quad (15)$$

Figure 6C:
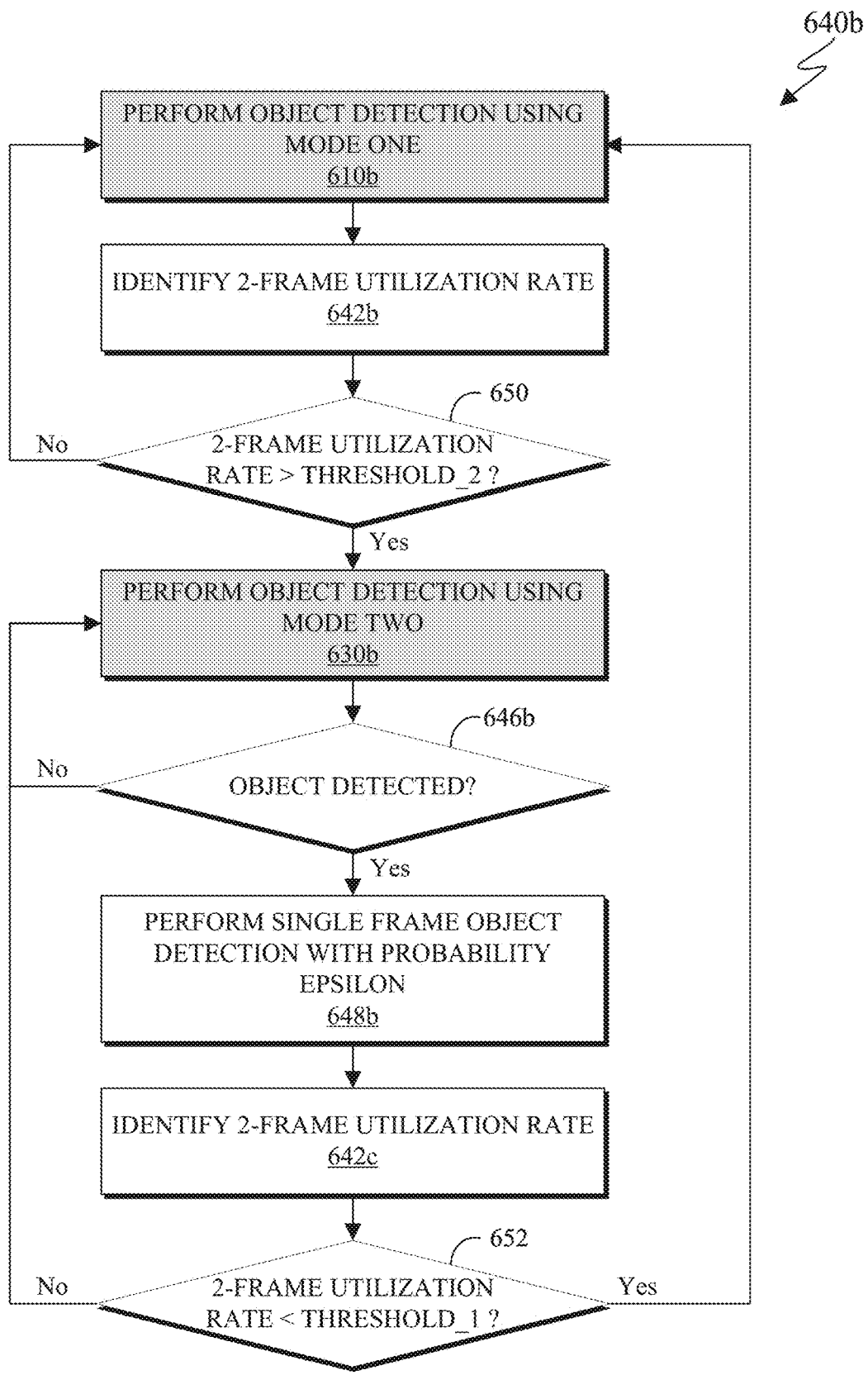

It is noted that the method 640*a* uses a single threshold for the utilization rate for switching from mode one 610 to mode two 630 and switching from mode two 630 to mode one 610. However, different thresholds can be used for the two switching directions (switching from mode one to mode two and switching from mode two to mode one), such as described in the method 640*b* as illustrated in FIG. 6C. For example, it could be undesirable for the operation mode to switch back and forth between mode one 610 and mode two 630. In that case, two thresholds could be used for the two directions of the switch.

FIG. 6C illustrates the method 640*b* describing another process using two different utilization thresholds for determining whether to use mode one 610 or mode two 630 for object detection. As illustrated, threshold_1 is for controlling the switch from mode two to mode one, while threshold_2 is for controlling the switch from mode one to mode two. Using different threshold values based on a direction of the switch can avoid the electronic device 200 from oscillating between the two modes.

In certain embodiments, threshold_2 is greater than threshold_1. For example, threshold_1 could be set to 75% and threshold_2 could be set to 85%.

An electronic device (such as the electronic device 200) initially starts with mode one 610. That is, in step 610*b*, the electronic device 200 performs object detection using mode one. In step 642*b*, the electronic device 200 identify the two-frame utilization rate. The two-frame utilization rate can be identified using Equation (13) or Equation (14). In step 650, the electronic device 200 determines whether the two-frame utilization rate (as identified in step 642b) is greater than the predefined threshold_2.

When the two-frame utilization rate is less than or equal to the predefined threshold_2 (as determined in step 650), the electronic device 200 returns to step 610b, and uses mode one 610 for a subsequent object detection. Alternatively, when the two-frame utilization rate is greater than the predefined threshold_2 (as determined in step 650), the electronic device 200 performs object detection using mode two 630 (step 630b).

After object detection is performed using mode two 630 (step 630b), the electronic device 200 in step 646b, determines whether a moving object was detected. When a moving object is not detected, the electronic device 200 returns to step 630b for a subsequent object detection operation. Alternatively, when a moving object is detected using mode two 630, the electronic device 200 in step 648b may perform additional processing to estimate an updated two-frame utilization rate. The additional processing can be similar to the processing described in step 648a. For example, the electronic device 200 may perform single-frame object detection with a probability of Epsilon.

After performing the single-frame processing or determining not to perform the single-frame processing, the electronic device 200 identifies the two-frame utilization rate (step 642c). The two-frame utilization rate can be identified using Equation (13) or Equation (15).

In step 652, the electronic device 200 determines whether the two-frame utilization rate is less than the predefined threshold_1. When the two-frame utilization rate is greater than the predefined threshold_1 (as determined in step 652), the electronic device 200 returns to step 630b, and uses mode two 630 for object detection. Alternatively, when the two-frame utilization rate is less than the predefined threshold_1 (as determined in step 652), the electronic device 200 performs object detection using mode one 610 (step 610b).

Figure 6D:
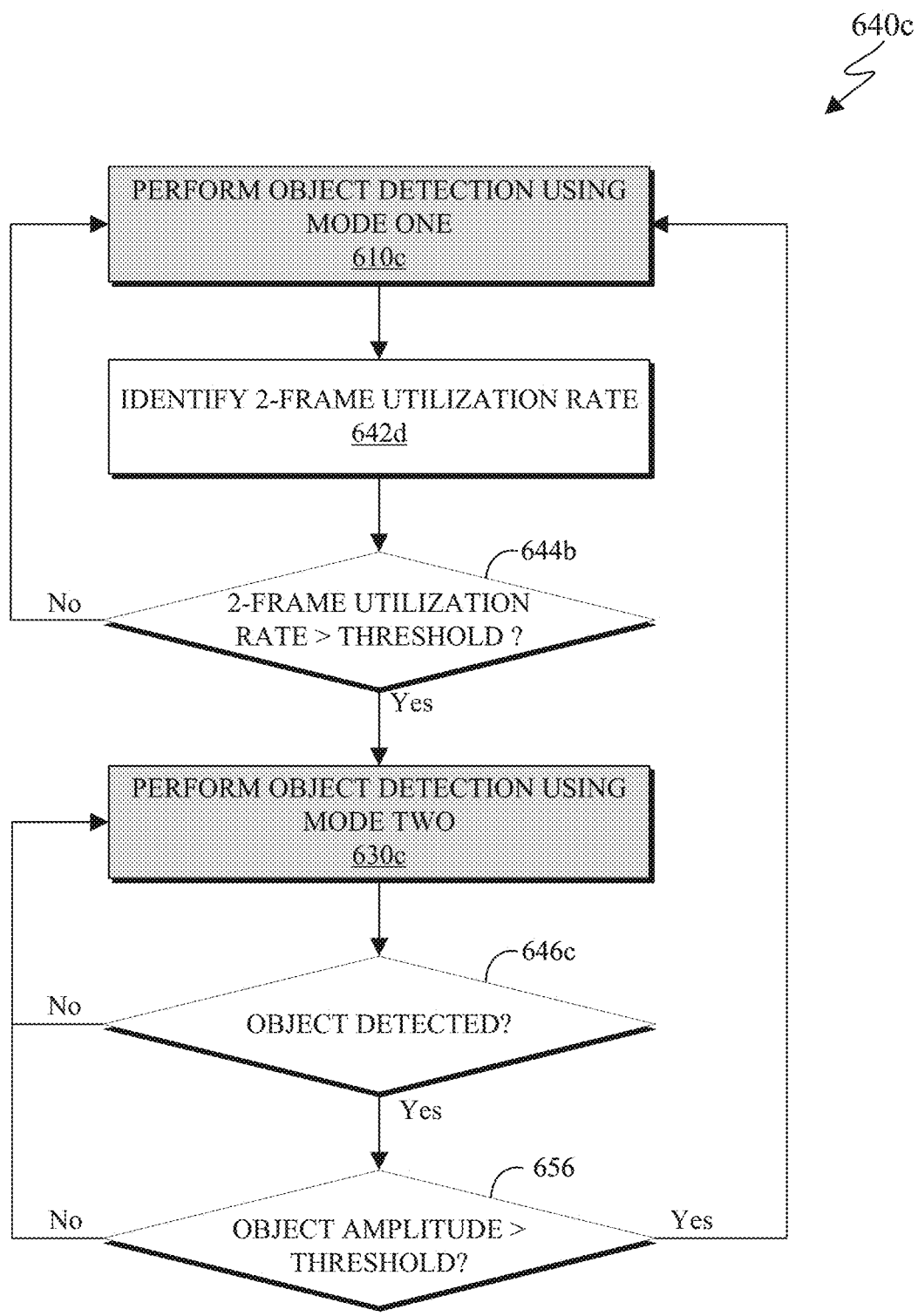
Figure 6E:
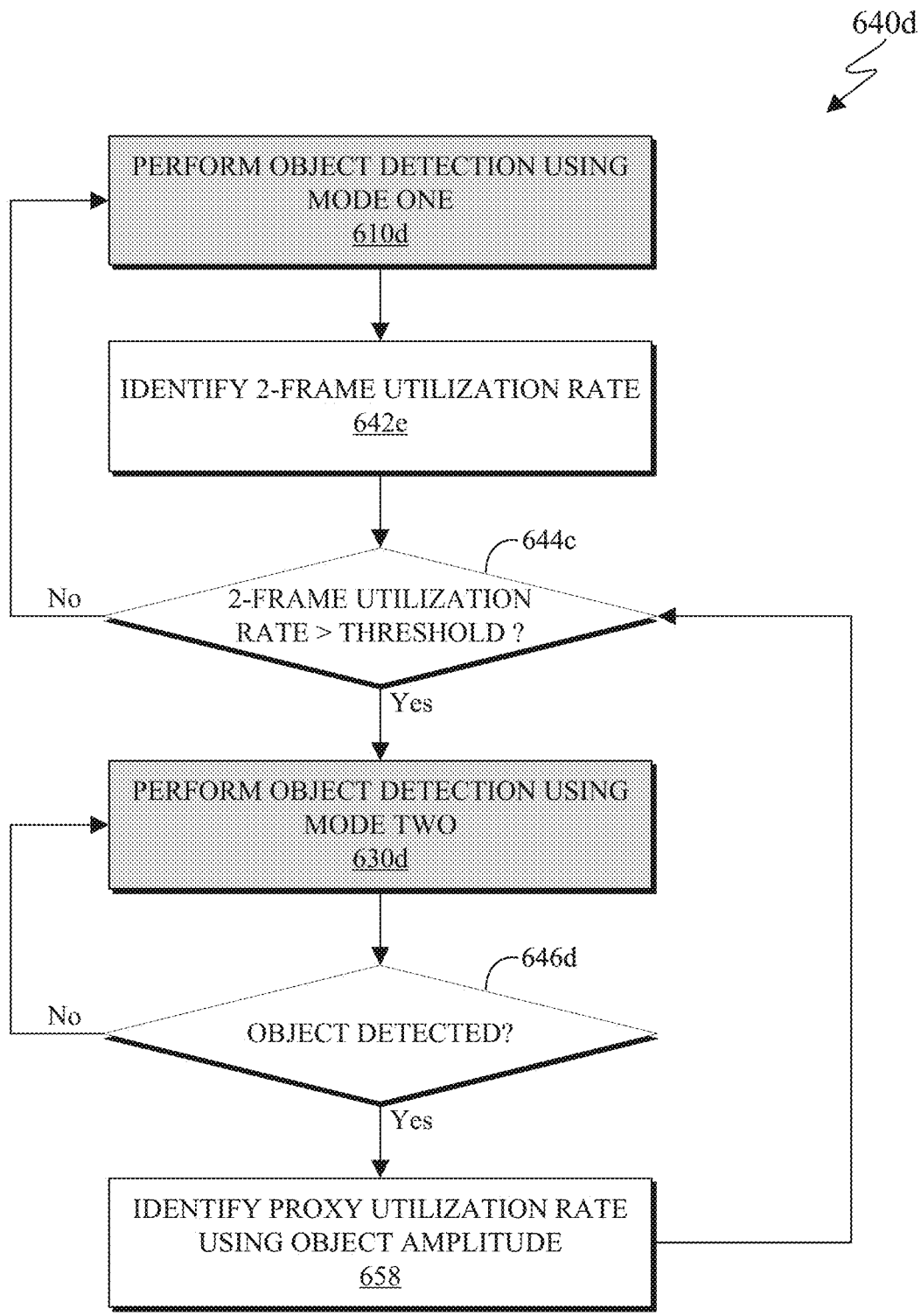

FIG. 6D illustrates the method 640c describing another process for determining whether to use mode one 610 or mode two 630 for object detection.

The method 640c uses amplitude of the detected object by the two-frame processing for switching from mode two 630 to mode one 610. It is noted that the method 640c is similar to a portion of the method 640a of FIG. 6B. The methods 640a and 640c both determine when to switch from mode one 610 to mode two 630 in a similar manner. However, when switching from mode two 630 to mode one 610 the methods 640a and 640c differ. For example, the method 640c switches from mode two 630 to mode one 610 based on the amplitude of the detected peak while in mode two 630 (two-frame processing). As described above, the object detection as described in step 420 of FIG. 4B does not explicitly identify the speed or Doppler information, rather the detection is based on energy after the 0-Doppler (or DC components) is removed. By removing the 0-Doppler, it implies that the remaining energy is from non-DC components. As such, the stronger the remaining energy, the more likely that the object has high movement level. Therefore, when the amplitude of the object is high it indicates that the object has high motion, such that single-frame processing would be more efficient. As such, when the amplitude is higher than a predefined threshold, the electronic device 200 switches from mode two 630 to mode one 610, as described in the method 640c.

An electronic device (such as the electronic device 200) initially starts with mode one 610. That is, in step 610c, the electronic device 200 performs object detection using mode one. In step 642d, the electronic device 200 identifies the two-frame utilization rate. The two-frame utilization rate can be identified using Equation (13) or Equation (14). In step 644b, the electronic device 200 determines whether the two-frame utilization rate (as identified in step 642d) is greater than a predefined threshold. The predefined threshold, of step 644b, can be similar to the predefined threshold, of step 644a.

When the two-frame utilization rate is less than or equal to the predefined threshold (as determined in step 644b), the electronic device 200 returns to step 610c, and uses mode one 610 for a subsequent object detection. Alternatively, when the two-frame utilization rate is greater than the predefined threshold (as determined in step 644b), the electronic device 200 performs object detection using mode two 630 (step 630c).

After object detection is performed using mode two 630 (step 630c), the electronic device 200 in step 646c, determines whether a moving object was detected. When a moving object is not detected, the electronic device 200 returns to step 630c for a subsequent object detection operation. Alternatively, when a moving object is detected using mode two 630, the electronic device 200 in step 656 compares the amplitude corresponding to the detected object to a threshold.

When the amplitude of the object is greater than a threshold (indicating that the object is moving), then the electronic device 200 returns to step 610c for a subsequent object detection using mode one 610. Alternatively, when the amplitude of the object is not greater than the threshold (indicating that the object has low movement or is almost stationary), then the electronic device 200 returns to step 630c for a subsequent object detection using mode two 630.

FIG. 6E illustrates the method 640d describing another process for determining whether to use mode one 610 or mode two 630 for object detection.

It is noted that the method 640d is similar to a portion of the method 640a of FIG. 6B. The methods 640a and 640d both determine when to switch from mode one 610 to mode two 630 in a similar manner. However, when switching from mode two 630 to mode one 610 the methods 640a and 640d differ. For example, rather than occasionally performing single-frame processing to identify the utilization rate for determining whether to switch from mode two 630 to mode one 610 (as described in the method 640a), the method 640d uses the detected amplitude as a proxy for single-frame processing for determining whether to switch from mode two 630 to mode one 610. For example, the method 640d treats a scenario where a detected object amplitude that is larger than a predefined threshold as being equivalent to when single-frame processing detects the object. This is described in Equation (16), below.

$$\text{2-frame utilization rate while in mode 2} = \frac{\text{\# times detected object by 2-frame is less than a threshold (in mode 2)}}{\text{\# times object was detected (in mode 2)}} \quad (16)$$

It is noted that in Equation (16), the condition, 'detected by two-frame is less than threshold' is the proxy estimate of the condition that 'target is detected by two-frame processing but not by single-frame processing.' The main difference between FIG. 6D and FIG. 6E is that FIG. 6E is more conservative in reverting back to mode one 610. For example, only when it is determined that the target characteristics show that single-frame processing can detect the target often enough, then the method 640d switches from mode two 630 to mode one 610.

An electronic device (such as the electronic device 200) initially starts with mode one 610. That is, in step 610d, the electronic device 200 performs object detection using mode one. In step 642e, the electronic device 200 identifies the two-frame utilization rate. The two-frame utilization rate can be identified using Equation (13) or Equation (14). In step 644c, the electronic device 200 determines whether the two-frame utilization rate (as identified in step 642e) is greater than a predefined threshold. The predefined threshold, of step 644c, can be similar to the predefined threshold, of step 644a.

When the two-frame utilization rate is less than or equal to the predefined threshold (as determined in step 644c), the electronic device 200 returns to step 610d, and uses mode one 610 for a subsequent object detection. Alternatively, when the two-frame utilization rate is greater than the predefined threshold (as determined in step 644c), the electronic device 200 performs object detection using mode two 630 (step 630d).

After object detection is performed using mode two 630 (step 630d), the electronic device 200 in step 646d, determines whether a moving object was detected. When a moving object is not detected, the electronic device 200 returns to step 630d for a subsequent object detection operation. Alternatively, when a moving object is detected using mode two 630, the electronic device 200 in step 658 identifies a proxy utilization rate using the amplitude of the detected object. In certain embodiments, the electronic device 200 identifies the proxy utilization rate using Equation (16). After identifying the proxy utilization rate, the electronic device 200 returns to step 644c and compares the proxy utilization rate to the threshold. Based on the comparison, the electronic device 200 performs object detection using mode one 610 (step 610d) or performs object detection using mode two 630 (step 620d) for the subsequent detection.

Although FIGS. 6A-6E illustrates example methods 600, 640a, 640b, 640c, and 640d, respectively, various changes may be made to FIGS. 6A-6E. For example, while the methods 600, 640a, 640b, 640c, and 640d are shown as a series of steps, various steps could overlap, occur in parallel, occur in a different order, or occur multiple times. In another example, steps may be omitted or replaced by other steps. In yet another example, the identified two-frame utilization rate can be expanded to include two or more frames, denoted as a multi-frame utilization rate.

FIGS. 7A-7D illustrate example methods 700a, 700b, 700c, and 700d, respectively, for determining a number of frames for detecting multiple objects according to embodiments of this disclosure. The methods 700a, 700b, 700c, and 700d are described as implemented by any one of the client device 106-114 of FIG. 1, the electronic device 300 of FIG. 3A, the electronic device 382 of FIG. 3E, and can include internal components similar to that of electronic device 200 of FIG. 2. However, the methods 700a, 700b, 700c, and 700d as shown in FIGS. 7A-7D could be used with any other suitable electronic device and in any suitable system, such as when performed by the electronic device 200. The embodiments of the method 700a-700d of FIGS. 7A-7D is for illustration only. Other embodiments can be used without departing from the scope of the present disclosure.

In certain embodiments, an electronic device can identify multiple objects in the FoV of the radar. When multiple objects are detected, the electronic device 200 checks (in a similar manner as descried in FIGS. 6A-6E, above) for each detected object in the previous frame. It is noted that multiple objects can be viewed as a multi-tracking problem. As such, the electronic device can use various tracking processes such as a multiple hypothesis tracking (MHT) algorithm. Embodiments, of the present disclosure take into consideration that various tracking processes, such as MHT, use state-space modeling as well as more information (such as speed estimate) for accurate tracking. In order to reduce the complexity of various tracking processes, embodiments of the present disclosure describe extending the single object detection, as described in FIG. 5, to a multi-object detection.

In step 710, an electronic device (such as the electronic device 200) performs a single-frame object detection using a current frame. It is noted that step 710 can be similar to step 510 of FIG. 5. In step 720, the electronic device 200 detects all targets in the current single-radar frame.

In step 730, the electronic device 200 checks for any possibly missing objects that were detected in the previous detection. The previous detection (and the result obtained from it) can be 2-frame detection or single-frame detection, based on the conditions discussed above in relation to FIGS. 6A to 6E. To check for missing objects, the electronic device assumes a maximum speed that an object can move. For example, a human finger, or arm can usually not move faster than (exceed) a certain speed. As such, based on the determined maximum speed that an object can move, there are only so many taps that the object can move within a duration of one radar detection update (which could be equal to the radar frame duration). Accordingly, the determination of whether the target detected in the previous detection is present in the current detection is by checking if there is a target detected in the current frame that is within ±k taps from the target detected from the previous detection. This check is conducted for each target detected in the previous processing. For example, The sub-steps (such as step 732 and step 734) within step 730 are performed for each of the detected objects in the previous detection.

In step 732, the electronic device 200 determines whether one of the objects in the current frame is within ±k taps from an object target detected in the previous detection. When a detected object in the current frame is within ±k taps from an object target detected in the previous detection, then the electronic device determines whether all of the objects in the previous detection are accounted for (step 734).

When all of the detected objects in the previous detection are accounted for (as determined in step 734), the electronic device 200 in step 740 outputs the detection result. Here the detection result is of the single-frame processing. Alternatively, when a detected object in the current frame is not within ±k taps from an object detected in the previous detection (as determined in step 732) or when not all of the objects in the previous detection are accounted for (as determined in step 734), the electronic device performs two-frame object detection (step 750). In step 740, the electronic device 200 then outputs the detection result. Here, the detection result is of the two-frame processing.

It is noted that if all the objects detected in the previous detection pass this check (step 730), then all previously detected targets are accounted for. Then, in step 740, the electronic device 200 outputs a detection result, where the detection result is of the single-frame processing. In this case, two-frame processing is not performed. Alternatively, if there is at least one target detected in the previous detection that has no corresponding target detected in the current detection by the current single-frame processing (i.e., no target detected in the current frame is within ±k taps of the target detected in the previous detection result), then the electronic device 200 determines that there is at least one previously detected target that is not accounted for. Then in step 750, the electronic device 200 performs the two-frame processing. The step 750 is similar to the step 530 of FIG. 5. After the two-frame processing is performed, the electronic device 200 outputs the detection result of the detection of the 2-frame processing in step 750.

Figure 7A:
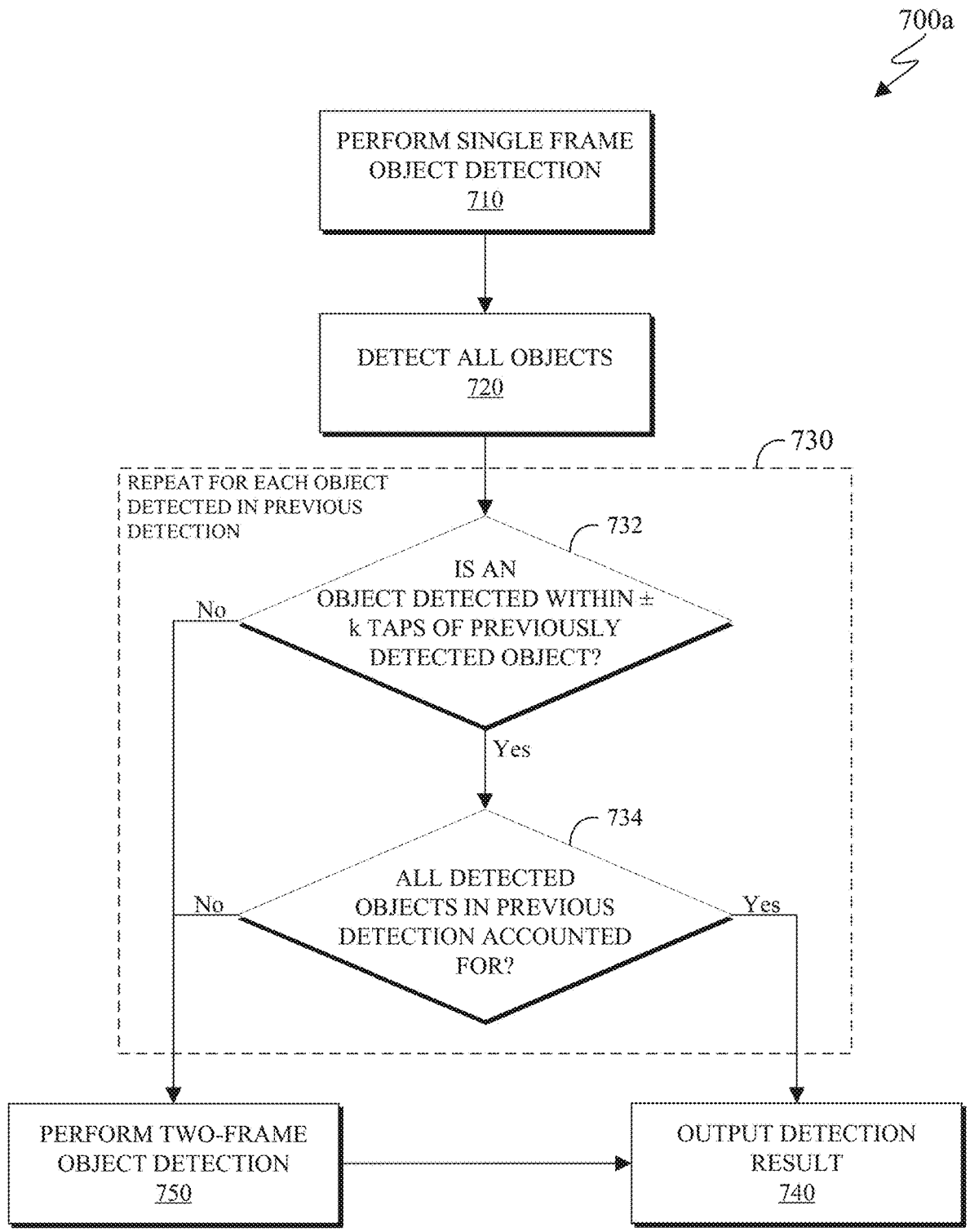
FIGS. 7A-7D illustrate example methods for determining a number of frames for detecting multiple objects according to embodiments of this disclosure.
Figure 7B:
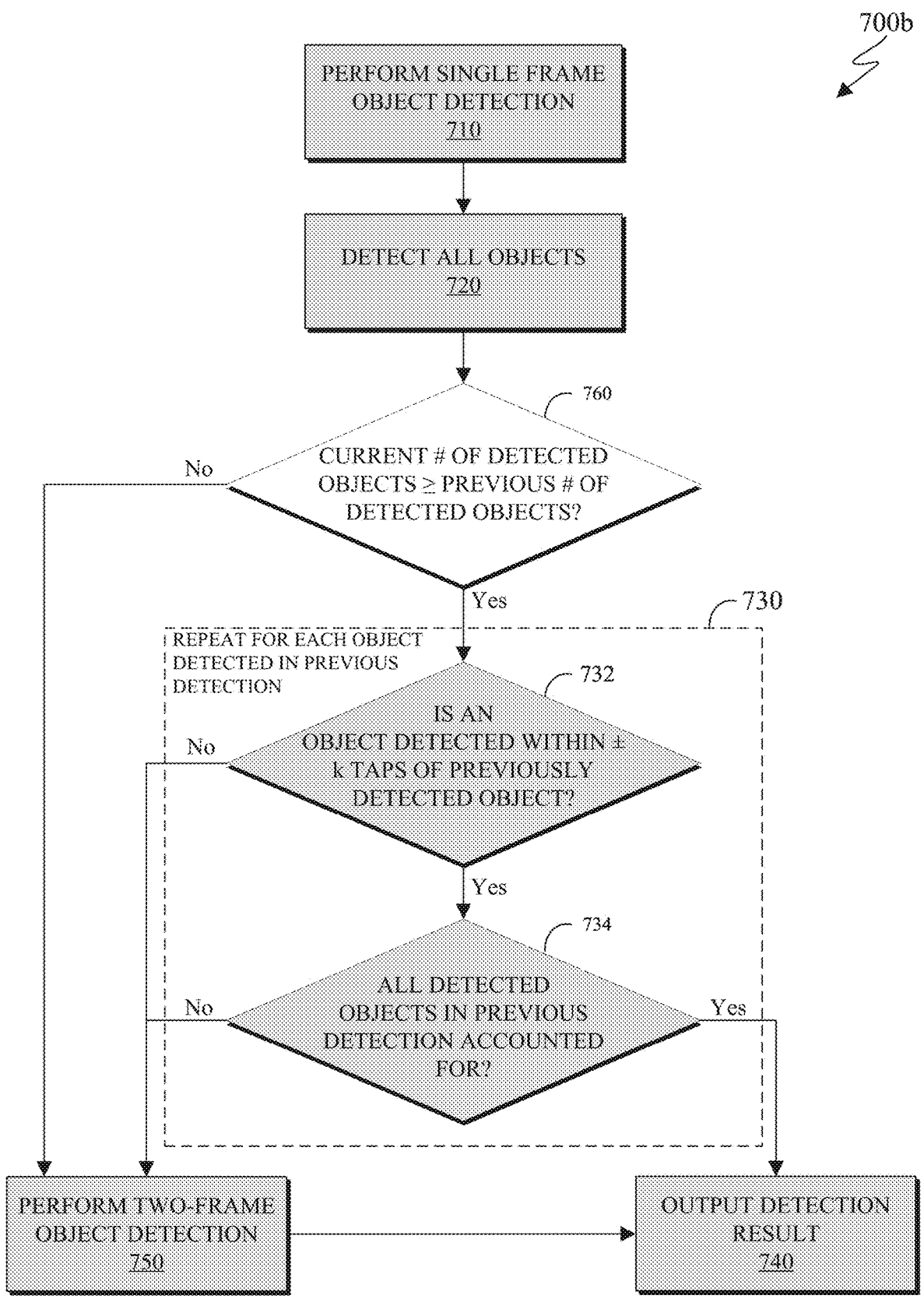

FIG. 7B illustrates the method 700b describing another process for determining whether to use single-frame processing or two-frame processing when multiple objects are detected. The method 700b is similar to the method 700a of FIG. 7A. For example, the method 700b adds the step 760 to the method 700a of FIG. 7A.

In step 760, the electronic device determines if there is one or more missing objects from the current single frame by comparing the number of targets detected previously and the targets detected in the current detection. If there is one or more missing objects from the current single frame, then the number of targets detected previously will be larger than the current number of detected targets. This means, there are target(s) missing in the current single frame detection. In this case, the electronic device would perform two-frame object detection (step 750).

Alternatively, in the case when the number of detected targets by the current single-frame is larger than the previous number of detected targets, it may indicate there are new targets appearing but no missing targets. Therefore, when the number of detected targets of the current single-frame is larger than the number of detected targets of the previous frame (as determined in step 760), the electronic device proceeds to step 730 to make sure all previously detected targets are accounted for.

Figure 7C:
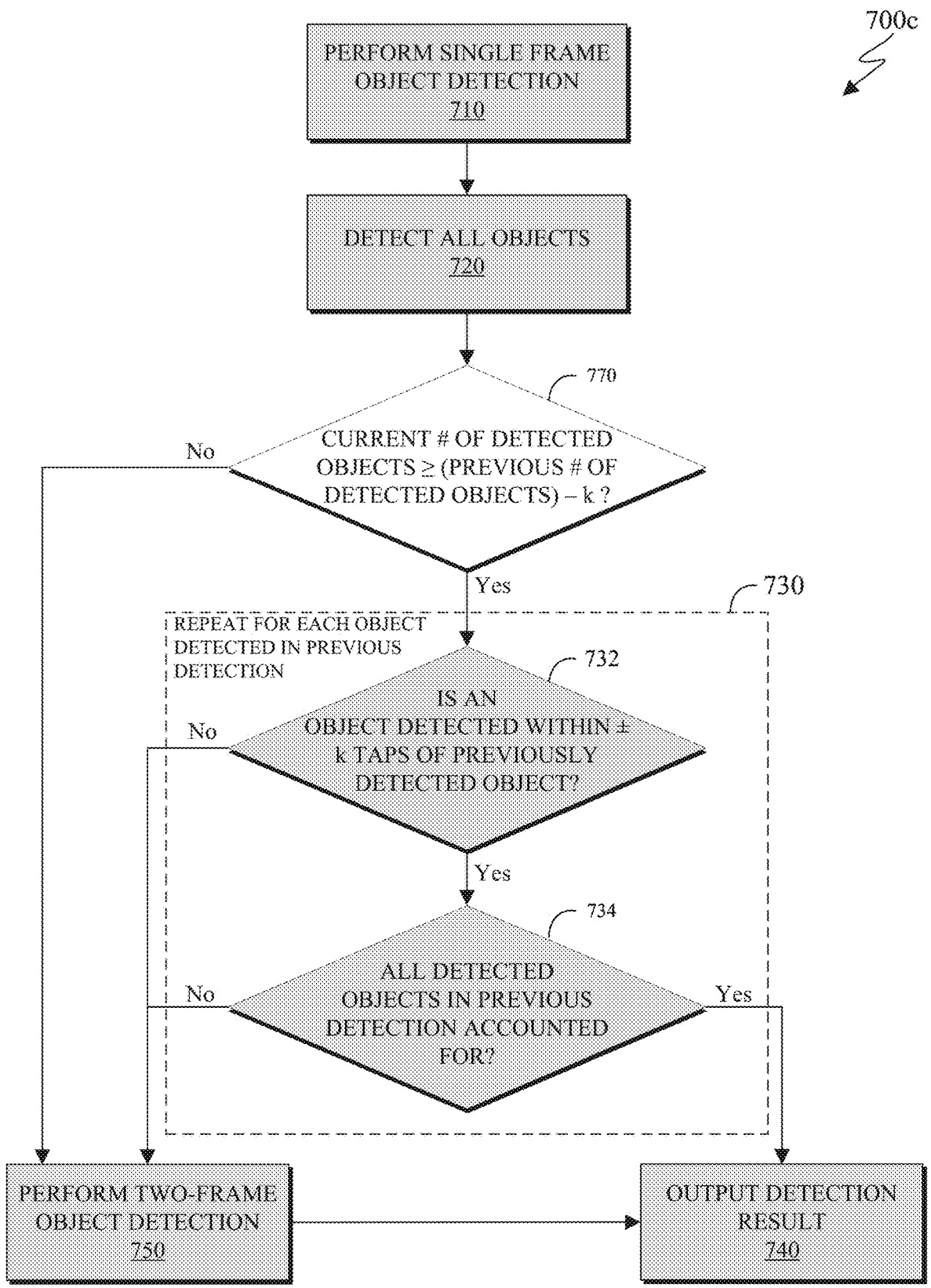

In certain embodiments, the smaller number of currently detected targets could also indicate some of the multiple objects could merge into the same range bin (i.e., their spacing is less than the range resolution). It is noted that FIG. 7A allows for such merging while FIG. 7B does not allow for merging of objects. FIG. 7C, allows for a certain number of targets to be merged.

FIG. 7C illustrates the method 700c describing another process for determining whether to use single-frame processing or two-frame processing when multiple objects are detected. The method 700c is similar to the method 700a of FIG. 7A and method 700b of FIG. 7B. For example, the method 700c adds step 770 to the method 700a of FIG. 7A. the step 770 is a modification of the step 760 of FIG. 7B.

In step 770, the electronic device 200 compares the number of detected objects in the current frame to the number of detected objects in the previous detection result, less a threshold value, k. The threshold value, k, is an integer, such as 1, 2, 3, or the like. That is, rather than requiring the current number of detected targets to be greater than or equal to the previous number of detected targets (as described in FIG. 7B), the step 770 provides margin as indicated by the threshold value, k.

In certain embodiments, another sub-step could be included in the step 730 of FIG. 7A that prevents repeated pairing (i.e., any newly detected target can be paired only once) during the process for checking and finding a corresponding pair of current and previously detected target. If there is a new target that gets paired more than once, it could mean there is a merging of some of the targets.

Figure 7D:
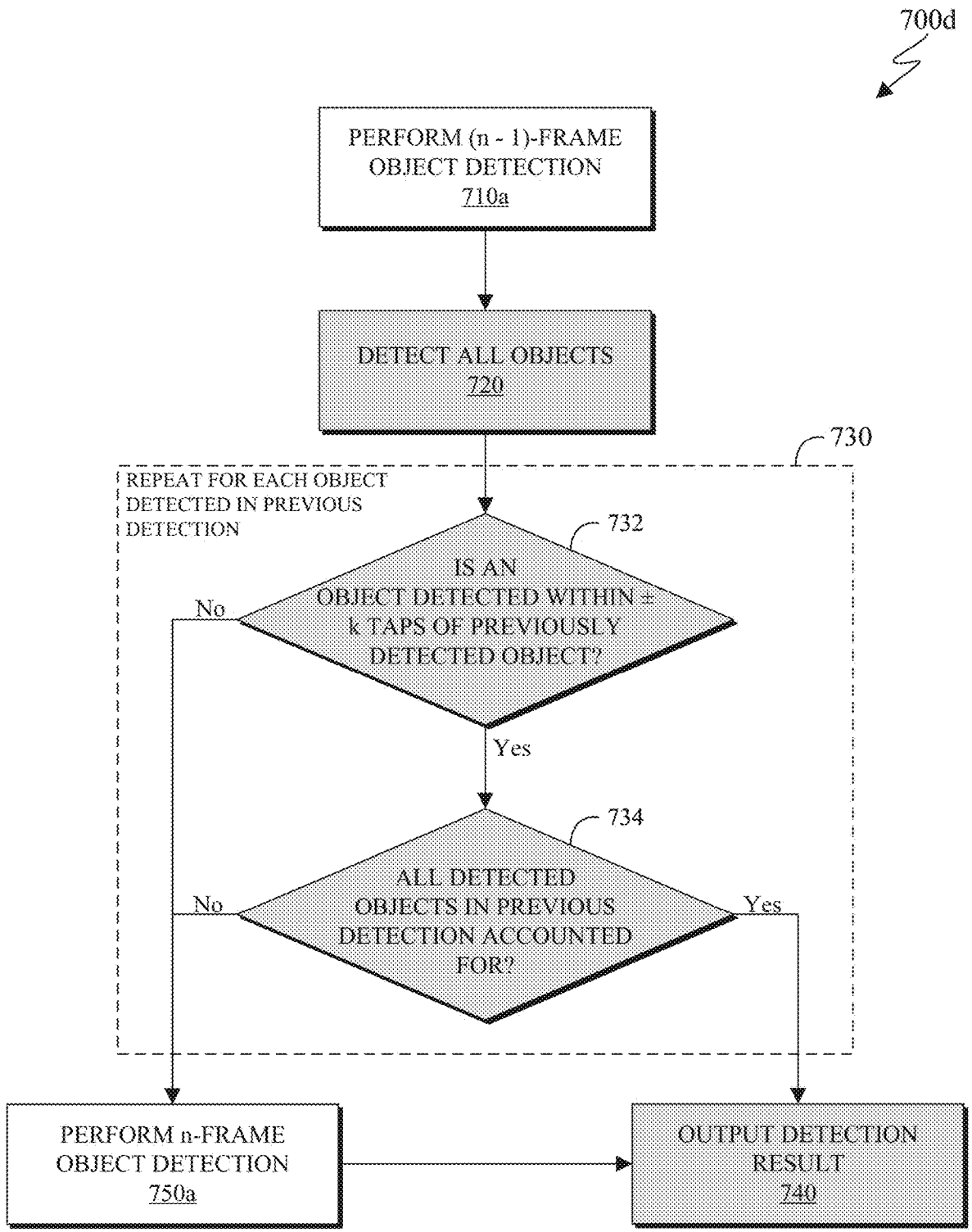

FIG. 7D illustrates the method 700d describing that the object detection can be extended beyond two frames. The method 700d describes an example for deciding whether to perform object detection for the current detection based on (n−1)-frame processing.

In certain embodiments, two-frame processing may have unacceptable misdetection rate, depending on selected radar frame duration and/or scenario of interest. In order to reduce the misdetection rate more frames (e.g., up to k frames) could be combined in the same manner as the two-frame processing described above. FIGS. 7A, 7B, and 7C can be extended to allow up to m-frame processing, as described in FIG. 7D. The method 700d of FIG. 7D describes a process for determining whether the detection result based on (n−1)-frame processing is accepted or whether to proceed to n-frame processing. Here, n can be an integer, such as 1, 2, 3, or the like. The process can be repeated, where the value of n increases during each repetition, up to a predefined upper limit, m. Upon reaching the upper limit, the electronic device 200 outputs the final detection result.

In step 710a, an electronic device (such as the electronic device 200) performs a (n−1)-frame object detection. It is noted that step 710 can be similar to step 510 of FIG. 5. In step 720, the electronic device 200 detects all targets in the current single-radar frame. In step 730, the electronic device 200 checks for any possibly missing objects that were detected in the previous frame. Upon determining that an object from the previous frame is missing in the current frame (as determined in step 730), the electronic device 200 in step 750a, performs n-frame object detection. In certain embodiments, the result of the n-frame object detection can be output in step 740. In other embodiments, the process repeats and the value of n is increased up to a predefined value, m. When (i) the value of n equals the value of m, and (ii) upon determining than an object from the previous detection is missing in the current detection (as determined in step 730), the electronic device 200 in step 750a, performs m-frame object detection.

Although FIGS. 7A-7D illustrate example methods 700a, 700b, 700c, and 700d, respectively, various changes may be made to FIGS. 7A-7D. For example, while the methods 700a, 700b, 700c, and 700d are shown as a series of steps, various steps could overlap, occur in parallel, occur in a different order, or occur multiple times. In another example, steps may be omitted or replaced by other steps.

In certain embodiments, rather than performing object detection for each radar frame (or k-frame) independently, the electronic device performs a recursive approach. Here, the average of the radar frame is approximated by a sliding window.

For example, the electronic device can save all radar measurements of all the pulses within the processing frame duration. For instance, if up to m-frame processing could be used, then all radar's CIRs from the most recent m single-frames are saved. Then, the averaging could be done on this saved data in the appropriate manner as described in earlier embodiments. This would require memory space to holds all those CIRs.

For another example, the electronic device can process the averaging in a per single-frame basis to reduce the memory requirement. It is noted that in this case, the meaning of the average changes from single-frame to single-frame, and it is not mathematically equivalent to 0-Doppler nulling as the original method that saves all the needed CIRs. In this case, the electronic device maintains a set of averages and all the CIRs of the current single-frame. Two averages should be maintained for each processing. One average is to approximate the 0-Doppler component, and the other average to keep the average of the result after the approximate 0-Doppler nulling. The number of averaged to be saved for the case of using up to m-frame processing is 2m (including the average of the current single frame). These averages are updated recursively, so that it can no longer apply the rectangular window like when saving all the needed CIRs, but it would use of some moving average methods such as an exponentially weighted average. Equation (17) describes the recursive operation.

$$X = \alpha X + (1-\alpha)Y \quad (17)$$

Here, X, is the average and Y is the new data that is to be incorporated into the average. The parameter $\alpha < 1$ can be chosen based on the desired memory length needed for each of the k-frame processing it is supposed to approximate.

For yet another example, the above method can be applied on a per pulse basis instead of the per single-frame-basis. Here, the parameter $\alpha$ of Equation (17) is selected based on the desired memory length needed for each of the k-frame processing it is supposed to approximate. This would allow the recursive processing to happen at every pulse and the memory requirement is further reduced. In certain embodiments, to further reduce the memory the electronic device does not save CIR of the current radar transmission frame.

Figure 8:
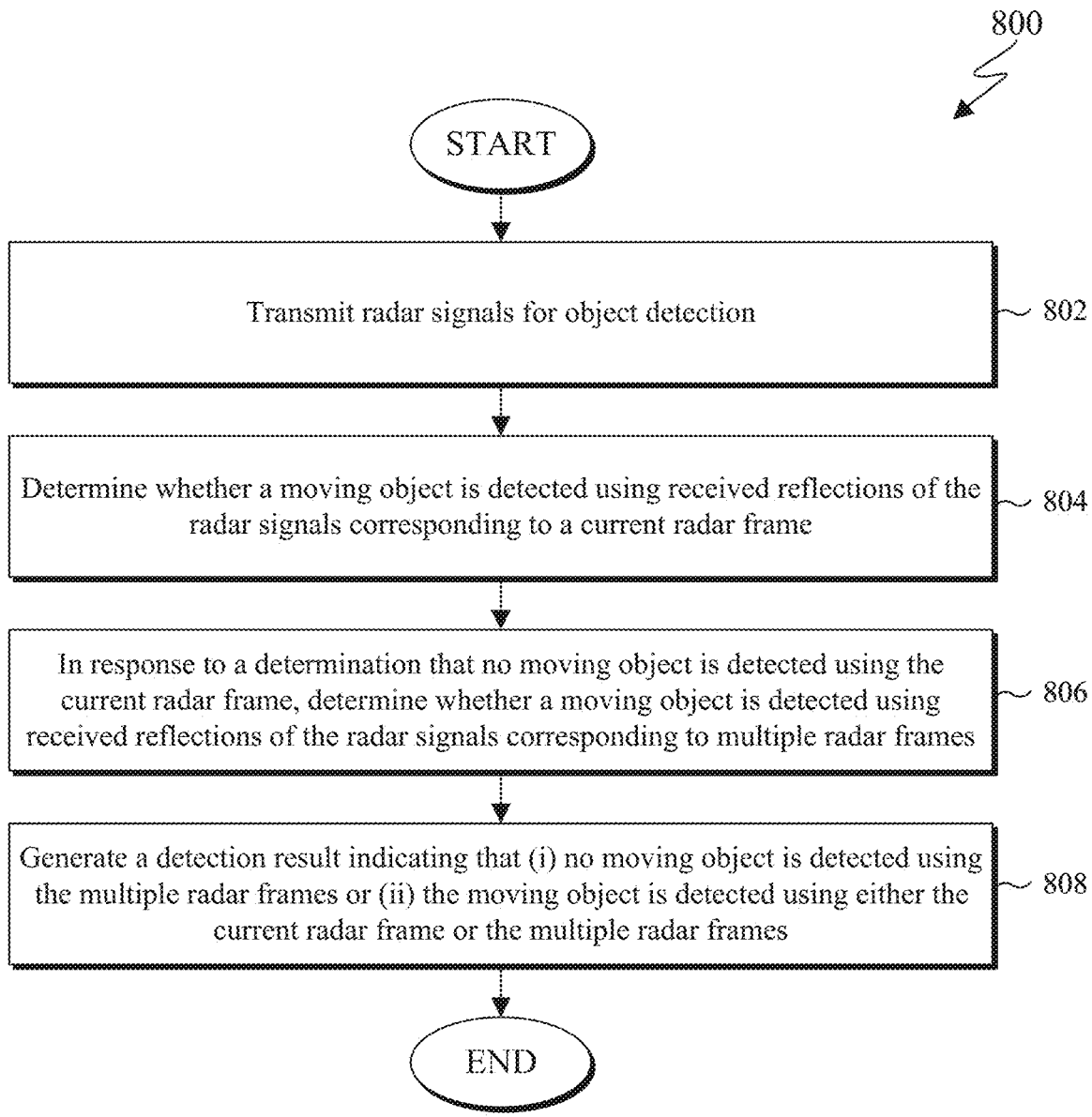
FIG. 8 illustrates an example method for determining a number of frames for object detection according to embodiments of this disclosure.

FIG. 8 illustrates an example method 800 for determining a number of frames for object detection according to embodiments of this disclosure. The method 800 is described as implemented by any one of the client device 106-114 of FIG. 1, the electronic device 300 of FIG. 3A, the electronic device 382 of FIG. 3E, and can include internal components similar to that of electronic device 200 of FIG. 2. However, the method 800 as shown in FIG. 8 could be used with any other suitable electronic device and in any suitable system, such as when performed by the electronic device 200. The embodiments of the method 800 of FIG. 8 is for illustration only. Other embodiments can be used without departing from the scope of the present disclosure.

In step 802, an electronic device (such as the electronic device 200) transmits signals for object detection. The electronic device 200 can also receive the transmitted signals that reflected off of an object via a radar transceiver, such as the radar transceiver 270 of FIG. 2. In certain embodiments, the signals are radar. The signals are used to detect an object with regions that expand from the electronic device.

In certain embodiments, the radar signals can be transmitted in frames that are separated by frame spacings. The transmission interval of a frame can be shorter than the frame spacing. The radar frames can include non-uniformly spaced radar pulses or uniformly spaced radar pulses.

In step 804, the electronic device 200 determines whether a moving object is detected using the received reflections of the signals corresponding to a current radar frame.

In response to a determination that no moving object is detected using current radar frame, the electronic device 200 in step 806, determines whether a moving object is detected using the received reflections of the signals corresponding to a multiple radar frames. The multiple radar frames include the current radar frame (used in step 804) and one or more previous radar frames. Each of the previous radar frames and the current radar frame can be separated by a frame spacing.

In step 808, the electronic device 200 generates a detection result. The detection result can indicate that no moving object is detected using the multiple radar frames. The detection result can also indicate that a moving object is detected using the current radar frame or the multiple radar frames. When the detection result indicates that a moving object is detected, the electronic device 200 can include additional information characterizing the object or the movement such as the magnitude of the motion, the direction of the motion, the range of the object or the like.

In certain embodiments, the electronic device 200 can determine whether to use a first mode or a second mode for object detection. The first mode for object detection includes steps 804 and 806. For example, in response to determining to use the first mode, the electric device 200 determines whether a moving object is detected using the current radar frame to generate a subsequent detection result. If the electronic device does not detect an object in the current radar frame, the electronic device 200 would then determine whether a moving object is detected using the current radar frame and one or more previous radar frames to generate a subsequent detection result. The second mode performs object detection using the current radar frame and one or more previous radar frames to generate a subsequent detection result. That is, in the second mode for object detection, the electronic device 200 performs object detection using multiple radar frames, while the first mode for object detection the electronic device can use a single radar frame or multiple radar frames for object detection.

To determine whether to use the first mode or the second mode for object detection, the electronic device 200 identifies a two-frame utilization rate (or multi-frame utilization rate). To identify a two-frame utilization rate, the electronic device identifies a first value and a second value. The first value represents a number of times that a moving object was detected using multiple instances of a single radar frame over a period of time. The second value represents a number of times that a moving object was detected using multiple instances of the multiple radar frames over the time period. The electronic device 200 then compares the identified two-frame utilization rate to a threshold. Based on the comparison, the electronic device 200 will use the first mode or the second mode for a subsequent object detection.

While in the second mode, the electronic device 200 may determine, based on a probability factor, whether to perform object detection using the current single-frame. This is useful for identifying the two-frame utilization rate while the electronic device is in the second mode (which typically does not perform object detection using a single (current) radar frame.

While in the second mode, the electronic device 200 may compare an amplitude, representing an amount of movement of a detected object, to a threshold. Based on a result from the comparison, the electronic device 200 can determine whether to switch from the second mode to the first mode for a subsequent object detection.

The two-frame utilization rate can be compared between two different thresholds. For example, the two-frame utilization rate can be compared to one threshold for potentially switching from mode one to mode two and compared to a different threshold for potentially switching from mode two to mode one. In this example, after the electronic device 200 determines that a moving object is detected using the second mode, the electronic device 200 identifies a first two-frame utilization rate and compares the first two-frame utilization rate to a first threshold. Based on a result from the comparison, the electronic device 200 can determine whether to switch from the second mode to the first mode for a subsequent object detection. Similarly, after the electronic device 200 determines that a moving object is detected using the first mode, the electronic device 200 identifies a second two-frame utilization rate and compares the second two-frame utilization rate to a second threshold. Based on a result from the comparison, the electronic device 200 can determine whether to switch from the first mode to the second mode for a subsequent object detection. A value associated with the second threshold is larger than a value associated with the first threshold.

In certain embodiments, the electronic device 200 detects multiple objects in the current radar frame. When multiple objects are detected in the current radar frame, the electronic device 200 determines whether a moving object of the multiple moving objects detected using a previous detection result is missing from the current radar frame. Upon determining that a moving object detected in the previous detection result is missing from the current radar frame, the electronic device 200 determines whether a moving object is detected using the multiple radar frames. Upon determining that no moving objects (detected using the previous detection result) are missing from the current radar frame, the electronic device 200 generates the detection result (step 810) based on the current radar frame.

To determine whether a moving object (detected using the previous detection result) is missing from the current radar frame, the electronic device 200 first detects the multiple moving objects using the current radar frame. The electronic device 200 can then determine whether each of the multiple moving objects detected in the current radar frame are within a predefined distance from one of the multiple moving objects detected in a previous detection result. When all of the moving objects detected in the current radar frame are within the predefined distance from one of the multiple moving objects detected in the previous detection result, the electronic device 200 determines whether all of the multiple moving objects detected in the previous detection result are accounted for. When all of the multiple moving objects detected in the previous detection result are accounted for, the electronic device 200 determines that no moving object detected in the previous detection result is missing from the current radar frame. However, when (i) at least one of the multiple moving objects detected in the current radar frame are further than the predefined distance from any of the multiple moving objects detected in the previous detection result or (ii) at least one of the multiple moving objects detected in the previous detection result does not correspond to any of the multiple moving objects detected using the current radar frame, the electronic device 200 determines that at least one of the multiple moving objects detected in the previous detection result is missing from the current radar frame.

In certain embodiments, the electronic device 200 modifies a wireless communication associated with the transceiver. The modification can be to reduce RF exposure to the object. In certain embodiments, the electronic device 200 determines presence of the user for context awareness based on the detection result.

Although FIG. 8 illustrates an example method 800, various changes may be made to FIG. 8. For example, while the method 800 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
    a transceiver; and
    a processor operably connected to the transceiver, the processor configured to:
        transmit, via the transceiver, radar signals for object detection,
        determine whether to use a first mode for object detection or a second mode for object detection using a multi-frame utilization rate,
        in response to a determination to use the second mode for object detection, determine whether a moving object is detected using received reflections of the radar signals corresponding to multiple radar frames,
        determine whether a moving object is detected using received reflections of the radar signals corresponding to a current radar frame,
        in response to a determination that no moving object is detected using the current radar frame, determine whether a moving object is detected using the received reflections of the radar signals corresponding to the multiple radar frames, and
        generate a detection result indicating that (i) no moving object is detected using the multiple radar frames or (ii) the moving object is detected using either the current radar frame or the multiple radar frames,
    wherein the radar signals are transmitted in frames of a first time duration that are separated by a frame spacing of a second time duration, wherein the second time duration is longer than the first time duration.

2. The electronic device of claim 1, wherein the multiple radar frames include the current radar frame and a previous radar frame that are separated by the second time duration.

3. The electronic device of claim 1, wherein the processor is further configured to:
    in response to a determination to use the first mode for object detection, determine whether a moving object is detected using the current radar frame or the multiple radar frames to generate a subsequent detection result, wherein the subsequent detection result is based on the current radar frame when a moving object is detected using the current radar frame, and the subsequent detection result is based on the multiple radar frames when a moving object is not detected using the current radar frame; and in response to a determination to use the second mode for object detection, determine whether a moving object is detected using the multiple radar frames to generate the subsequent detection result.

4. The electronic device of claim 3, wherein to determine whether to use the first or second mode for object detection, the processor is further configured to:
  identify a first value representing a number of times that a moving object was detected using multiple instances of a single radar frame over a period of time;
  identify a second value representing a number of times a moving object was detected using multiple instances of the multiple radar frames over the period of time;
  identify the multi-frame utilization rate based on the first and second values;
  compare the multi-frame utilization rate to a threshold; and
  determine to use the first mode for object detection or the second mode for object detection based on a result of the comparison.

5. The electronic device of claim 4, wherein the processor is further configured to:
  in response to a determination to use the second mode for object detection, determine whether a first moving object is detected using the multiple radar frames;
  in response to a determination that the first moving object is detected using the multiple radar frames, determine, based on a probability factor, whether to perform object detection using the current radar frame; and
  in response to a determination to perform object detection using the current radar frame based on the probability factor, determine whether the first moving object, detected using the multiple radar frames, is also detected using the current radar frame for identification of the multi-frame utilization rate.

6. The electronic device of claim 3, wherein:
  after determining that the moving object is detected using the second mode, the processor is configured to:
    identify a first multi-frame utilization rate,
    compare the first multi-frame utilization rate to a first threshold, and
    determine, for a subsequent object detection, to use the first mode or the second mode, based on a result of the comparison between the first multi-frame utilization rate and the first threshold;
  after performing the object detection using the first mode, the processor is configured to:
    identify a second multi-frame utilization rate,
    compare the second multi-frame utilization rate to a second threshold, and
    determine, for the subsequent object detection, to use the first mode or the second mode, based on a result of the comparison between the second multi-frame utilization rate and the second threshold;
  the first threshold is used for switching from the second mode to the first mode;
  the second threshold is used for switching from the first mode to the second mode; and
  the second threshold is larger than the first threshold.

7. The electronic device of claim 3, wherein in response to a determination to use the second mode for object detection, the processor is configured to:
  determine whether a first moving object is detected using the multiple radar frames;
  in response to a determination that the first moving object is detected using the multiple radar frames, compare an amplitude, representing an amount of movement of the first moving object, to a threshold; and
  determine, for a subsequent object detection, whether to use the first mode or the second mode, based on a result of the comparison.

8. The electronic device of claim 1, wherein the processor is further configured to:
  when multiple moving objects are detected using the current radar frame, determine whether a moving object of multiple moving objects is detected using a previous detection result is missing from the current radar frame;
  in response to a determination that a moving object detected using the previous detection result is missing from the current radar frame, determine whether a moving object is detected using the multiple radar frames; and
  in response to a determination that no moving object detected using the previous detection result is missing from the current radar frame, generate the detection result based on the current radar frame.

9. The electronic device of claim 8, wherein to determine whether a moving object is detected using the previous detection result is missing from the current radar frame, the processor is further configured to:
  detect the multiple moving objects using the current radar frame;
  determine whether each of the multiple moving objects detected in the current radar frame is within a predefined distance from one of the multiple moving objects detected in the previous detection result;
  when all of the moving objects detected in the current radar frame are within the predefined distance from one of the multiple moving objects detected in the previous detection result, determine whether all of the multiple moving objects detected in the previous detection result are accounted for;
  when all of the multiple moving objects detected in the previous detection result are accounted for, determine that no moving object detected in the previous detection result is missing from the current radar frame; and
  when (i) at least one of the multiple moving objects detected in the current radar frame are further than the predefined distance from any of the multiple moving objects detected in the previous detection result or (ii) at least one of the multiple moving objects detected in the previous detection result does not correspond to any of the multiple moving objects detected using the current radar frame, determine that at least one of the multiple moving objects detected in the previous detection result is missing from the current radar frame.

10. The electronic device of claim 1, wherein the processor is configured to modify a wireless communication operation associated with the transceiver based on the detection result indicating that the moving object is detected.

11. A method, comprising:
  transmitting, via a transceiver, radar signals for object detection;
  determine whether to use a first mode for object detection or a second mode for object detection using a multi-frame utilization rate;
  in response to a determination to use the second mode for object detection, determine whether a moving object is detected using received reflections of the radar signals corresponding to multiple radar frames;

determining whether a moving object is detected using received reflections of the radar signals corresponding to a current radar frame;

in response to a determination that no moving object is detected using the current radar frame, determining whether a moving object is detected using the received reflections of the radar signals corresponding to the multiple radar frames; and generating a detection result indicating that (i) no moving object is detected using the multiple radar frames or (ii) the moving object is detected using either the current radar frame or the multiple radar frames, wherein the radar signals are transmitted in frames of a first time duration that are separated by a frame spacing of a second time duration, wherein the second time duration is longer than the first time duration.

12. The method of claim 11, wherein the multiple radar frames include the current radar frame and a previous radar frame that are separated by the second time duration.

13. The method of claim 11, further comprising:

in response to a determination to use the first mode for object detection, determining whether a moving object is detected using the current radar frame or the multiple radar frames to generate a subsequent detection result, wherein the subsequent detection result is based on the current radar frame when a moving object is detected using the current radar frame, and the subsequent detection result is based on the multiple radar frames when a moving object is not detected using the current radar frame; and in response to a determination to use the second mode for object detection, determining whether a moving object is detected using the multiple radar frames to generate the subsequent detection result.

14. The method of claim 13, wherein determining whether to use the first or second mode for object detection, comprises:

identifying a first value representing a number of times that a moving object was detected using multiple instances of a single radar frame over a period of time;

identifying a second value representing a number of times a moving object was detected using multiple instances of the multiple radar frames over the period of time;

identifying the multi-frame utilization rate based on the first and second values;

comparing the multi-frame utilization rate to a threshold; and determining to use the first mode for object detection or the second mode for object detection based on a result of the comparison.

15. The method of claim 14, further comprising:

in response to a determination to use the second mode for object detection, determining whether a first moving object is detected using the multiple radar frames;

in response to a determination that the first moving object is detected using the multiple radar frames, determining, based on a probability factor, whether to perform object detection using the current radar frame; and in response to a determination to perform object detection using the current radar frame based on the probability factor, determining whether the first moving object, detected using the multiple radar frames, is also detected using the current radar frame for identification of the multi-frame utilization rate.

16. The method of claim 13, wherein:

after determining that the moving object is detected using the second mode, the method comprises:

identifying a first multi-frame utilization rate, comparing the first multi-frame utilization rate to a first threshold, and determining, for a subsequent object detection, to use the first mode or the second mode, based on a result of the comparison between the first multi-frame utilization rate and the first threshold;

after performing the object detection using the first mode, the method comprises:

identifying a second multi-frame utilization rate, comparing the second multi-frame utilization rate to a second threshold, and determining, for the subsequent object detection, to use the first mode or the second mode, based on a result of the comparison between the second multi-frame utilization rate and the second threshold;

the first threshold is used for switching from the second mode to the first mode;

the second threshold is used for switching from the first mode to the second mode; and the second threshold is larger than the first threshold.

17. The method of claim 13, wherein in response to determining to use the second mode for object detection, the method comprises:

determining whether a first moving object is detected using the multiple radar frames;

in response to a determination that the first moving object is detected using the multiple radar frames, comparing an amplitude, representing an amount of movement of the first moving object, to a threshold; and determining, for a subsequent object detection, whether to use the first mode or the second mode, based on a result of the comparison.

18. The method of claim 11, further comprising:

when multiple moving objects are detected using the current radar frame, determining whether a moving object of multiple moving objects is detected using a previous detection result is missing from the current radar frame;

in response to a determination that a moving object detected using the previous detection result is missing from the current radar frame, determining whether a moving object is detected using the multiple radar frames; and in response to a determination that no moving object detected using the previous detection result is missing from the current radar frame, generating the detection result based on the current radar frame.

19. The method of claim 11, further comprising modifying a wireless communication operation associated with the transceiver based on the detection result indicating that the moving object is detected.

20. A non-transitory computer-readable medium embodying a computer program, the computer program comprising computer readable program code that, when executed by a processor of an electronic device, causes the processor to:

transmit, via a transceiver, radar signals for object detection;

determine whether to use a first mode for object detection or a second mode for object detection using a multi-frame utilization rate;

in response to a determination to use the second mode for object detection, determine whether a moving object is detected using received reflections of the radar signals corresponding to multiple radar frames;

determine whether a moving object is detected using received reflections of the radar signals corresponding to a current radar frame;

in response to a determination that no moving object is detected using the current radar frame, determine whether a moving object is detected using the received reflections of the radar signals corresponding to the multiple radar frames; and generate a detection result indicating that (i) no moving object is detected using the multiple radar frames or (ii) the moving object is detected using either the current radar frame or the multiple radar frames, wherein the radar signals are transmitted in frames of a first time duration that are separated by a frame spacing of a second time duration, wherein the second time duration is longer than the first time duration.

\* \* \* \* \*